(12) United States Patent
Doki et al.

(10) Patent No.: US 11,385,190 B2
(45) Date of Patent: Jul. 12, 2022

(54) X-RAY PHASE IMAGING APPARATUS AND X-RAY PHASE CONTRAST IMAGE GENERATION METHOD

(71) Applicant: Shimadzu Corporation, Kyoto (JP)

(72) Inventors: Takahiro Doki, Kyoto (JP); Kenji Kimura, Kyoto (JP); Taro Shirai, Kyoto (JP); Satoshi Sano, Kyoto (JP); Akira Horiba, Kyoto (JP); Naoki Morimoto, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 204 days.

(21) Appl. No.: 16/834,694

(22) Filed: Mar. 30, 2020

(65) Prior Publication Data

US 2020/0333265 A1   Oct. 22, 2020

(30) Foreign Application Priority Data

Apr. 22, 2019   (JP) .............................. JP2019-081101

(51) Int. Cl.
*G01N 23/041*   (2018.01)
*G06T 5/00*   (2006.01)

(52) U.S. Cl.
CPC ........... *G01N 23/041* (2018.02); *G06T 5/002* (2013.01); *G01N 2223/401* (2013.01); *G06T 2207/10016* (2013.01); *G06T 2207/10116* (2013.01)

(58) Field of Classification Search
CPC ........... G01N 23/041; G01N 2223/401; G01N 2223/32; G06T 2207/10016; G06T 2207/10116; G06T 5/50; A61B 6/4411; A61B 6/032; A61B 6/4208; A61B 6/5205; A61B 6/5211; A61B 6/5258; A61B 6/54

See application file for complete search history.

(56) References Cited

U.S. PATENT DOCUMENTS

2015/0182178 A1* 7/2015 Baturin .................. A61B 6/484
378/36
2018/0356355 A1   12/2018 Momose et al.

FOREIGN PATENT DOCUMENTS

| JP | 2012-016370 A | 1/2012 |
| JP | 2015118074 A | 6/2015 |
| JP | 2017-044603 A | 3/2017 |
| JP | 2018134229 A * | 8/2018 |
| JP | 2019045412 A | 3/2019 |
| WO | 2009/104560 A1 | 8/2009 |

(Continued)

OTHER PUBLICATIONS

Translation of JP 2018134229 A (Year: 2018).*

(Continued)

*Primary Examiner* — David P Porta
*Assistant Examiner* — Mamadou Faye
(74) *Attorney, Agent, or Firm* — Muir Patent Law, PLLC

(57) ABSTRACT

The X-ray phase imaging apparatus includes an imaging system, a position switching mechanism for switching between a retracted position and an imaging position, a control unit for controlling switching between the retracted position and the imaging position, and an image processing unit for generating an X-ray phase contrast image based on the first image and the second image. The control unit is configured to control sequentially imaging at the retracted position and imaging at the imaging position.

11 Claims, 15 Drawing Sheets

(56) References Cited

FOREIGN PATENT DOCUMENTS

WO 2017175364 A1 10/2017

OTHER PUBLICATIONS

Pfeiffer et al., "Phase retrieval and differential phase-contrast imaging with low-brilliance-X-ray-sources," Nat. Phys. 2, 258 (2006).
Notice of Reasons for Refusal, dated Apr. 19, 2022, issued in relation to the corresponding Japanese Patent Application No. 2019-081101, along with an English-language machine translation thereof (7 pages).

* cited by examiner (Third Modified Example)

X-RAY PHASE IMAGING APPARATUS AND X-RAY PHASE CONTRAST IMAGE GENERATION METHOD

CROSS-REFERENCE TO THE RELATED APPLICATIONS

The priority application number JP2019-081101, entitled "X-ray phase imaging apparatus and X-ray phase contrast image generation method", filed on Apr. 22, 2019, invented by DOKI Takahiro, KIMURA Kenji, SHIRAI Taro, SANO Satoshi, HORIBA Akira, and MORIMOTO Naoki upon which this patent application is based is hereby incorporated by reference.

BACKGROUND OF THE INVENTION

Field of the Invention

The present invention relates to an X-ray phase imaging apparatus and an X-ray phase contrast image generation method.

Description of the Background Art

Conventionally, an X-ray phase imaging apparatus is known. Such an X-ray phase imaging apparatus is disclosed, for example, in Japanese Unexamined Patent Application Publication No. 2012-16370.

The X-ray phase imaging apparatus disclosed in Japanese Unexamined Patent Application Publication No. 2012-16370 is provided with an X-ray source, a detector, and a plurality of gratings. The detector is arranged toward the X-ray source. The plurality of gratings includes a multiple slit for enhancing coherence of the X-ray source and a grating for diffracting the X-rays. The multi slit is arranged in the vicinity of the X-ray source between the X-ray source and the X-ray image detector. The grating for diffracting the X-rays is arranged between the multiple slit and the detector. The X-ray phase imaging apparatus disclosed in Japanese Unexamined Patent Application Publication No. 2012-16370 generates a differential phase image (X-ray phase contrast image) by interfering X-rays emitted from an X-ray source using a plurality of gratings while moving any of the plurality of gratings in a direction of the grating pitch.

The conventional X-ray phase imaging apparatus as disclosed in Japanese Unexamined Patent Application Publication No. 2012-16370 can image a light element object or a biological soft tissue that is difficult to absorb X-rays by imaging the inside of the object by using a phase difference of X-rays instead of an absorption amount of X-rays.

Here, in the configuration in which an X-ray phase contrast image is generated by performing imaging while translating a grating, an X-ray phase contrast image in which the inside of the subject is imaged is generated based on the intensity signal curve in cases where no subject is placed between a plurality of gratings and the intensity signal curve in cases where a subject is placed. Therefore, when the position of the grating fluctuates between imaging in a state in which the subject is not arranged and imaging in a state in which the subject is arranged due to thermal expansion of the grating due to heat generation from the X-ray source or the like, vibrations of the grating, or the like, an artifact (virtual image) occurs in the X-ray phase contrast image. In this case, it is possible to suppress the occurrence of artifacts in the X-ray phase contrast image by re-acquiring images captured without arranging the subject. However, in the conventional X-ray phase imaging apparatus disclosed in Japanese Unexamined Patent Application Publication No. 2012-16370, when imaging is performed in a condition in which a subject is not arranged, the operator needs to remove the subject, which causes a burden on the operator.

SUMMARY OF THE INVENTION

The present invention has been made to solve the above problems, and an object of the present invention is to provide an X-ray phase imaging apparatus and an X-ray phase contrast image generation method capable of suppressing the occurrence of artifacts in a generated X-ray phase contrast image while reducing a burden on an operator.

In order to achieve the above object, an X-ray phase imaging apparatus according to a first aspect of the present invention includes:

an imaging system including an X-ray source, a detector for detecting X-rays emitted from the X-ray source, and a plurality of gratings arranged between the X-ray source and the detector;

a subject holding unit configured to hold a subject;

a position switching mechanism configured to switch between a retracted position in which a position of the subject is out of a region to be imaged by the detector and an imaging position in which the position of the subject is within the region to be imaged by the detector by changing a relative position between the subject holding unit and the imaging system;

a control unit configured to control switching between the retracted position and the imaging position by the position switching mechanism; and an image processing unit configured to generate an X-ray phase contrast image based on a first image captured at the retracted position and a second image captured at the imaging position, wherein the control unit is configured to control sequentially imaging at the retracted position and imaging at the imaging position.

Note that an X-ray phase contrast image includes an absorption image, a phase differential image, and a dark field image. An absorption image is an image obtained by imaging a subject based on X-rays decay that occurs as the X-rays pass through the subject. A phase differential image is an image obtained by imaging a subject based on a phase shift of X-rays generated when the X-rays pass through the subject. A dark field image is a visibility image obtained by a change in visibility based on small angle scattering of an object. The dark field image is also called a small angle scattering image. The "visibility" refers to the sharpness of a self-image.

An X-ray phase contrast image generation method according to a second aspect of the present invention includes:

a step of moving a subject to a retracted position in which a position of the subject is out of a region to be imaged by relatively moving an imaging system including an X-ray source, a detector for detecting X-rays emitted from the X-ray source, and a plurality of gratings arranged between the X-ray source and the detector and a subject holding unit;

a step of capturing a first image at the retracted position;

a step of relatively moving the subject holding unit and the imaging system to an imaging position where the position of the subject is within the region to be imaged by the detector;

a step of capturing a second image at the imaging position; and a step of generating an X-ray phase contrast image based on the first image and the second image, wherein the step of capturing the first image and the step of capturing the second image are performed sequentially.

DESCRIPTION OF THE PREFERRED EMBODIMENTS

Hereinafter, embodiments in which the present invention is embodied will be described with reference to the attached drawings.

Referring to FIG. 1 to FIG. 4, a configuration of an X-ray phase imaging apparatus 100 according to an embodiment will be described.

(Configuration of X-Ray Phase Imaging Apparatus)

First, with reference to FIG. 1, a configuration of an X-ray phase imaging apparatus 100 according to an embodiment of the present this embodiment will be described.

Figure 1:
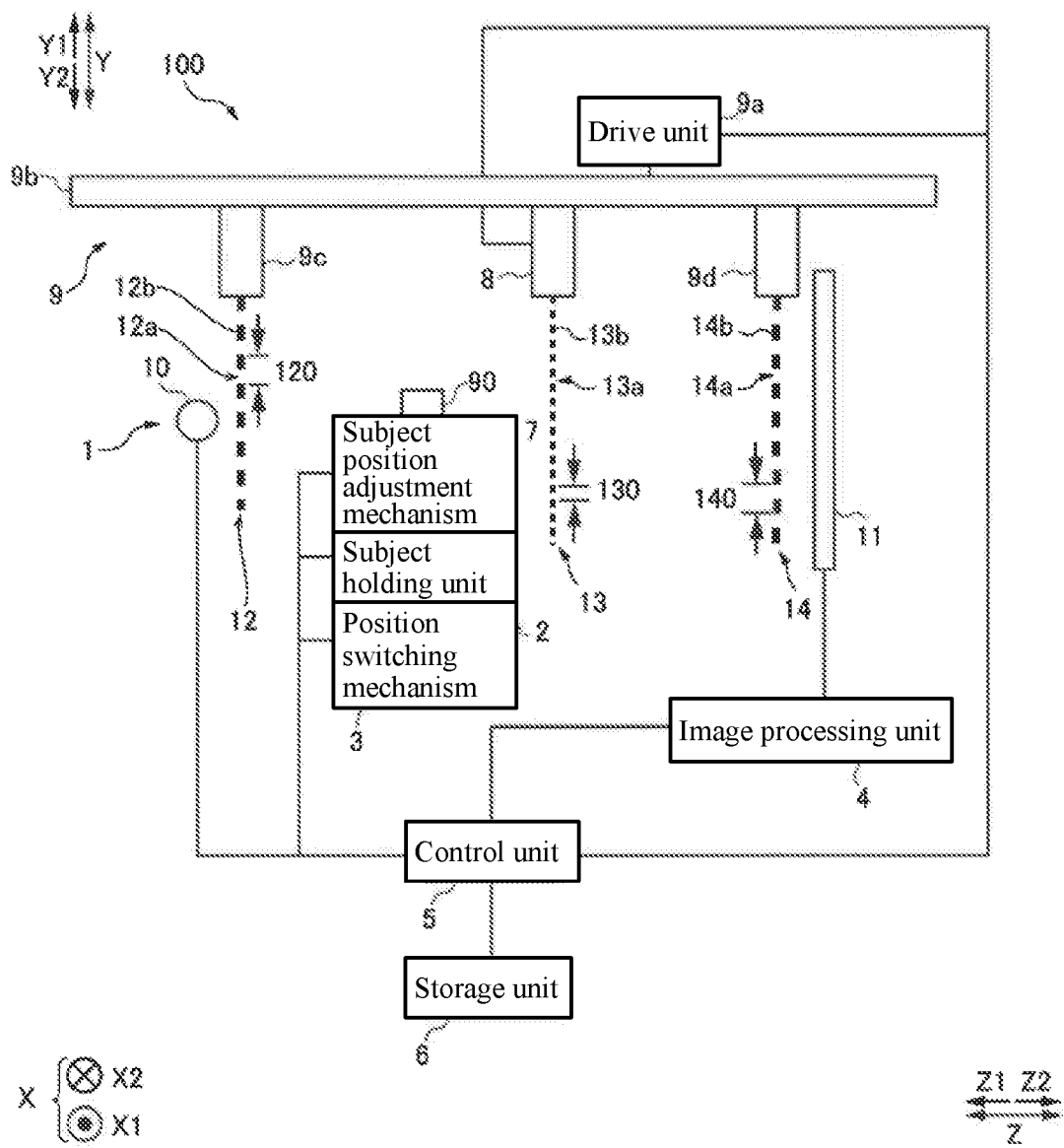
FIG. 1 is a schematic diagram showing an X-ray phase imaging apparatus according to an embodiment.

As shown in FIG. 1, the X-ray phase imaging apparatus 100 is an apparatus for imaging an interior of a subject 90 by utilizing a Talbot effect. The X-ray phase imaging apparatus 100 is configured to capture an image of the subject 90 while translating any one of a plurality of gratings in the grating period direction (Y-direction).

The X-ray phase imaging apparatus 100 is provided with an imaging system 1, a subject holding unit 2, a position switching mechanism 3, an image processing unit 4, a control unit 5, a storage unit 6, a subject position adjustment mechanism 7, a grating position adjustment mechanism 8, and an imaging system holding unit 9.

The imaging system 1 includes an X-ray source 10, a detector 11, and a plurality of gratings.

The plurality of gratings is arranged between the X-ray source 10 and detector 11. The plurality of gratings includes a first grating 12, a second grating 13, and a third grating 14. In this specification, the vertical direction (the up-down direction of the paper of FIG. 1) is defined as a Y-direction. In the Y-direction, the upper direction is defined as a Y1-direction and the lower direction is defined as a Y2-direction. Further, the left-right direction in a plane perpendicular to the Y-direction is defined as an X-direction. A direction toward the back side of the paper of FIG. 1 is defined as an X2-direction and a direction toward the front side of the paper of FIG. 1 is defined as an X1 direction. The up-down direction in the plane perpendicular to the Y-direction is denoted as a Z-direction, and the left direction of the paper of FIG. 1 is denoted as a Z1-direction, and the right direction of the paper of FIG. 1 is denoted as a Z2-direction.

The X-ray source 10 is configured to generate X-rays when a high voltage is applied, and emit the generated X-rays toward the first grating 12. In this embodiment, the X-ray source 10 includes a cathode (not shown) for generating an electron beam, an anode for generating X-rays by being collided by the electron beam, a voltage application unit (not shown) for applying a voltage between the cathode and the anode, and the like, and is an X-ray generation apparatus in which the cathode, the anode, and the voltage application unit are provided in a housing (not shown).

The detector 11 is configured to detect X-rays, convert the detected X-rays into an electrical signal, and read the converted electrical signal as an image signal. The detector 11 is, for example, an FPD (Flat Panel Detector). The detector 11 is composed of a plurality of conversion elements (not shown) and a plurality of pixel electrodes (not shown) arranged on the plurality of conversion elements. The plurality of conversion elements and pixel electrodes are arrayed in the X-direction and the Y-direction in an array with a given period (pixel pitch). The detector 11 is configured to output the acquired image signal to the image processing unit 4.

The first grating 12 has a plurality of X-ray transmission portion 12a and a plurality of X-ray absorption portions 12b arranged in the Y-direction with a given period (pitch) 120. The X-ray transmission portion 12a and X-ray absorption portion 12b are each formed to extend linearly. The X-ray transmission portion 12a and X-ray absorption portion 12b are each formed to extend in parallel with each other. The first grating 12 is a so-called multi slit.

The first grating 12 is arranged between the X-ray source 10 and the second grating 13. The first grating 12 is configured so that the X-ray passed through the X-ray transmission portion 12a serves as a line light source. When the pitches of the three pieces of gratings, i.e., the first grating 12, the second grating 13, and the third grating 14, and the distances between the gratings meet a predetermined condition, the coherence of the X-rays emitted from the X-ray source 10 can be enhanced. This is called the Lau effect. As a result, even if the focal length of the bulb of the X-ray source 10 is large, the interferometric intensity can be maintained.

The second grating 13 has a plurality of slits 13a and X-ray phase change portions 13b arranged in the Y-direction with a given period (pitch) 130. The slit 13a and X-ray phase change portion 13b are each formed to extend linearly. The slit 13a and X-ray phase change portion 13b are each formed to extend in parallel with each other. The second grating 13 is a so-called phase grating.

The second grating 13 is arranged between the X-ray source 10 and the third grating 14 and is irradiated with X-rays from the X-ray source 10. The second grating 13 is provided to form a self-image (not shown) of the second grating 13 by a Talbot effect. When the coherent X-rays pass through the grating in which the slits are formed, an image of the grating (self-image) is formed at a predetermined distance (Talbot distance) from the grating. This is called a Talbot effect.

The third grating 14 has a plurality of X-ray transmission portions 14a and a plurality of X-ray absorption portions 14b arranged in the Y-direction at a given pitch 140. The X-ray transmission portion 14a and X-ray absorption portion 14b are each formed to extend linearly. The X-ray transmission portion 14a and the X-ray absorption portion 14b are each formed to extend in parallel with each other. The third grating 14 is a so-called absorption grating. The first grating 12, the second grating 13, and the third grating 14 each are a grating different in role, but the X-ray transmission portion 12a, the slit 13a, and the X-ray transmission portion 14a allow X-rays to transmit therethrough. The X-ray absorption portion 12b and the X-ray absorption portion 14b each serve to shield X-rays, and the X-ray phase change portion 13b changes the phase of X-rays by a difference in refractive index from the slit 13a.

The third grating 14 is arranged between the second grating 13 and the detector 11 and is irradiated with X-rays that have passed through the second grating 13. The third grating 14 is arranged at a position away from the second grating 13 by a Talbot distance. The third grating 14 interferes with the self-image of the second grating 13 to form a moiré fringe (not shown) on the detection surface of the detector 11. Thus, the X-ray phase imaging apparatus 100 in this embodiment is constituted by a so-called Talbot-Lau interferometer.

The subject holding unit 2 is configured to hold a subject 90. The detailed configuration of the subject holding unit 2 will be described later.

The position switching mechanism 3 is configured to switch between a retracted position 60 (see FIG. 5) in which the position of the subject 90 is outside the region to be imaged 40 (see FIG. 5) of the detector 11 and the imaging position 61 (see FIG. 6) in the region to be imaged 40 of the detector 11 by changing the relative position between the subject holding unit 2 and the imaging system 1 under the control of the control unit 5. Note that switching between the retracted position 60 and the imaging position 61 means moving the subject holding unit 2 from the retracted position 60 to the imaging position 61 and moving the subject holding unit 2 from the imaging position 61 to the retracted position 60. The detailed configuration of the position switching mechanism 3 will be described later.

Figure 11:
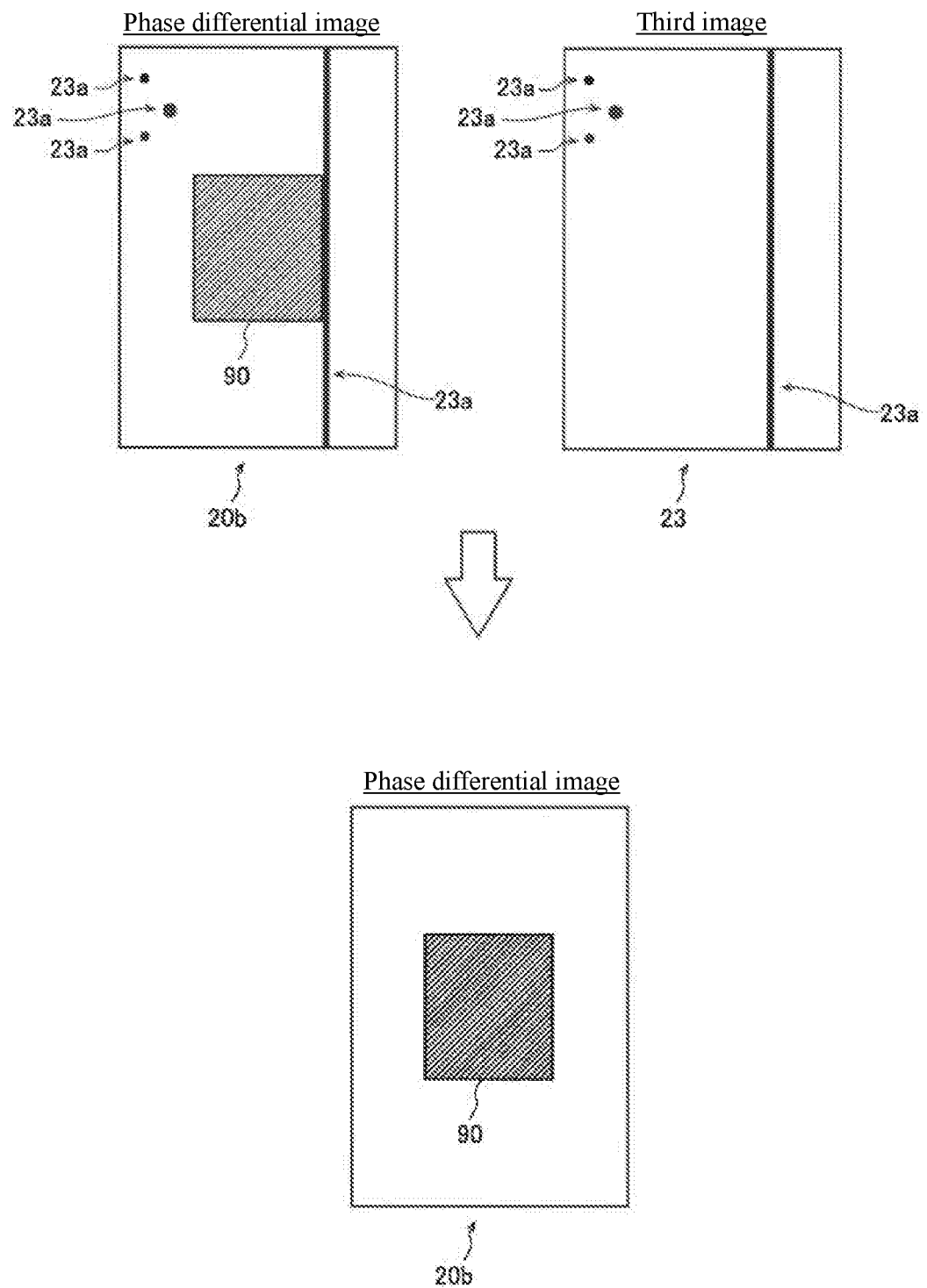
FIG. 11 is a schematic diagram for explaining the removal of noises by a third image.

The image processing unit 4 is configured to generate an X-ray phase contrast image 20 (see FIG. 7) based on the image signal outputted from the detector 11. Specifically, the image processing unit 4 is configured to generate an X-ray phase contrast image 20 based on the first image 21 (see FIG. 7) captured at the retracted position 60 and the second image 22 (see FIG. 7) captured at the imaging position 61. The image processing unit 4 is also configured to generate a third image 23 (FIG. 11). The third image 23 is an image for removing noises 23a (see FIG. 11) caused by the imaging system 1. In this embodiment, the image processing unit 4 generates, as the X-ray phase contrast image 20, for example, an absorption image 20a (see FIG. 7), a phase differential image 20b (see FIG. 7), and a dark field image 20c (see FIG. 7). The image processing unit 4 includes a processor such as, for example, a GPU (Graphics Processing Unit) and an FPGA (Field-Programmable Gate Array) configured for imaging.

The control unit 5 is configured to control switching the retracted position 60 and the imaging position 61 by controlling the position switching mechanism 3. The control unit 5 is configured to control the grating position adjustment mechanism 8 to adjust the relative position of the plurality of gratings. The control unit 5 is configured to control the grating position adjustment mechanism 8 to move the second grating 13. The control unit 5 includes, for example, a CPU (Central Processing Unit), a ROM (Read Only Memory), a RAM (Random Access Memory), and the like.

The storage unit 6 is configured to store programs executed by the control unit 5, the X-ray phase contrast image 20, the first image 21, the third image 23 generated by the image processing unit 4, and the like. The storage unit 6 includes, for example, an HDD (Hard Disk Drive) or a nonvolatile memory.

The subject position adjustment mechanism 7 is configured to adjust the position of the subject 90 under the control of the control unit 5. The detailed configuration of the subject position adjustment mechanism 7 will be described later.

The grating position adjustment mechanism 8 is configured to adjust the relative position of a plurality of gratings under the control of the control unit 5. Specifically, the grating position adjustment mechanism 8 is configured to adjust the relative position of the plurality of gratings by adjusting the position of the second grating 13. The grating position adjustment mechanism 8 is configured to be able to move the second grating 13 under the control of the control unit 5.

The imaging system holding unit 9 is provided with a drive unit 9a, a beam portion 9b, a grating holding member 9c, and a grating holding member 9d. The beam portion 9b is configured to extend in the optical axis direction (Z-direction) of X-rays. The imaging system holding unit 9 is configured to hold a plurality of gratings so as to be suspended from above. The imaging system holding unit 9 is configured to hold all the grating of the first grating 12, the second grating 13, and the third grating 14 so as to be suspended from above. In the example shown in FIG. 1, the imaging system holding unit 9 holds the first grating 12 via the grating holding member 9c. The imaging system holding unit 9 holds the second grating 13 via the grating position adjustment mechanism 8. The imaging system holding unit 9 holds the third grating 14 via the grating holding member 9d. The drive unit 9a is configured to be able to move the beam portion 9b in the Y-direction under the control of the control unit 5. The drive unit 9a includes, for example, a motor or the like.

(Subject Position Adjustment Mechanism)

Figure 2:
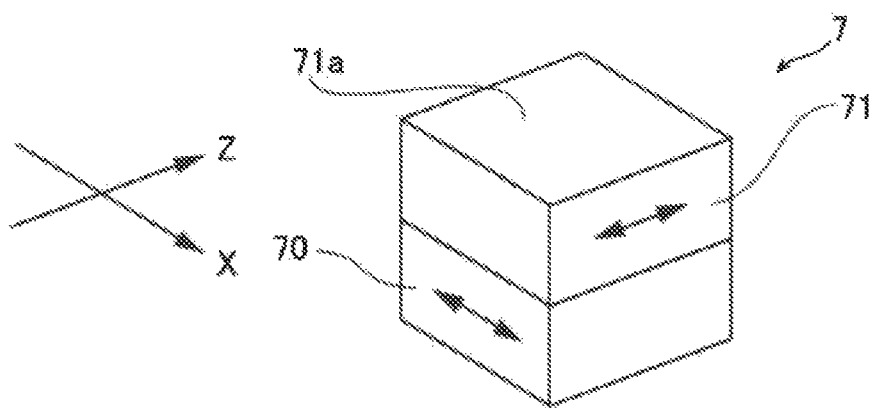
FIG. 2 is a schematic diagram of a subject position adjustment mechanism.

The subject position adjustment mechanism 7 is configured to be able to move the subject 90 in the X-direction and in the Z-direction. Specifically, as shown in FIG. 2, the subject position adjustment mechanism 7 includes an X-direction linear motion mechanism 70 and a Z-direction linear motion mechanism 71. The Z-direction linear motion mechanism 71 is provided with a mounting surface 71a on which the subject 90 is mounted. The X-direction linear motion mechanism 70 is configured to be movable in the X-direction. The X-direction moving mechanism includes, for example, a motor or the like. The Z-direction linear motion mechanism 71 is configured to be movable in the Z-direction. The Z-direction moving mechanism includes, for example, a motor or the like.

The subject position adjustment mechanism 7 is configured to move the subject 90 in the X-direction by the operation of the X-direction linear motion mechanism 70. The subject position adjustment mechanism 7 is configured to be able to move the subject 90 in the Z-direction by the operation of the Z-direction linear motion mechanism 71. Therefore, the subject position adjustment mechanism 7 can adjust the position of the subject 90 by moving the subject 90 in the X-direction and in the Z-direction direction. The subject position adjustment mechanism 7 is a mechanism for finely adjusting the position of the subject 90 at the time of image performing. The distance that the subject position adjustment mechanism 7 moves the subject 90 is shorter than the distance that the position switching mechanism 3 moves the subject 90.

(Grating Position Adjustment Mechanism)

Figure 3:
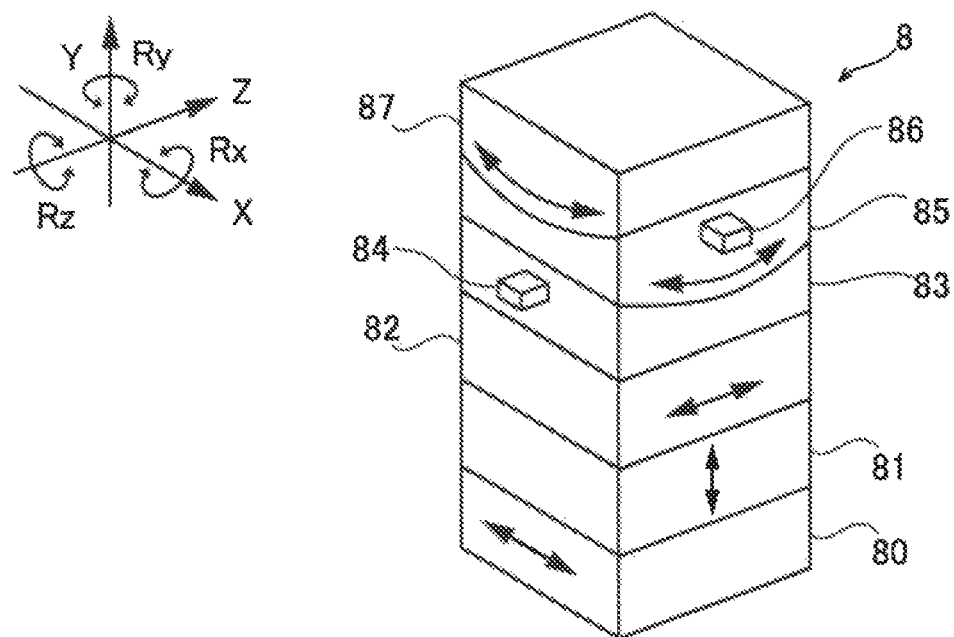
FIG. 3 is a schematic diagram of a grating position adjustment mechanism.

As shown in FIG. 3, the grating position adjustment mechanism 8 is configured to be able to move the second grating 13 in the X-direction, in the Y-direction, in the Z-direction, in the rotation direction (Rz) about the axis of the Z-direction, in the rotation direction (Rx) about the axis of the X-direction, and in the rotation direction (Ry) about the axis of the Y-direction. Specifically, the grating position adjustment mechanism 8 includes an X-direction linear motion mechanism 80, a Y-direction linear motion mechanism 81, a Z-direction linear motion mechanism 82, a linear motion mechanism connecting portion 83, a stage support portion drive portion 84, a stage support portion 85, a stage drive portion 86, and a stage 87. The X-direction linear motion mechanism 80 is configured to be movable in the X-direction direction. The X-direction linear motion mechanism 80 includes, for example, a motor or the like. The Y-direction linear motion mechanism 81 is configured to be movable in the Y-direction. The Y-direction linear motion mechanism 81 includes, for example, a motor and the like. The Z-direction linear motion mechanism 82 is configured to be movable in the Z-direction. The Z-direction linear motion mechanism 82 includes, for example, a motor or the like. In the example shown in FIG. 3, the stage 87 is shown facing upward for the sake of convenience. In this embodiment, the grating position adjustment mechanism 8 is provided on the imaging system holding unit 9 so that the stage 87 faces downward (opposite to the direction shown in FIG. 3).

The grating position adjustment mechanism 8 is configured to move the second grating 13 in the X-direction by the operation of the X-direction linear motion mechanism 80. The grating position adjustment mechanism 8 is configured to move the second grating 13 in the Y-direction by the operation of the Y-direction linear motion mechanism 81. The grating position adjustment mechanism 8 is configured to move the second grating 13 in the Z-direction by the operation of the Z-direction linear motion mechanism 82.

The stage support portion 85 supports the stage 87 in the up-down direction (Y2-direction). The stage drive portion 86 is configured to reciprocate the stage 87 in the X-direction direction. The bottom portion of the stage 87 is formed in a convex curved surface shape toward the stage support portion 85 and is configured to rotate about the axial line of the Z-direction (in the Rz-direction) by reciprocating in the X-direction. The stage support portion drive portion 84 is configured to reciprocate the stage support portion 85 in the Z-direction. The bottom of the stage support portion 85 is formed in a convex curved surface shape toward the linear motion mechanism connecting portion 83 and is configured to be rotated about the axis line (Rx-direction) of the X-direction by being reciprocated in the Z-direction direction. The linear motion mechanism connecting portion 83 is provided on the X-direction linear motion mechanism 80 so as to be rotatable about the axial line of the Y-direction (Ry-direction). Thus, the grating position adjustment mechanism 8 can pivot the grating about the central axis of the Y-direction.

(Subject Holding Unit and Position Switching Mechanism)

Figure 4:
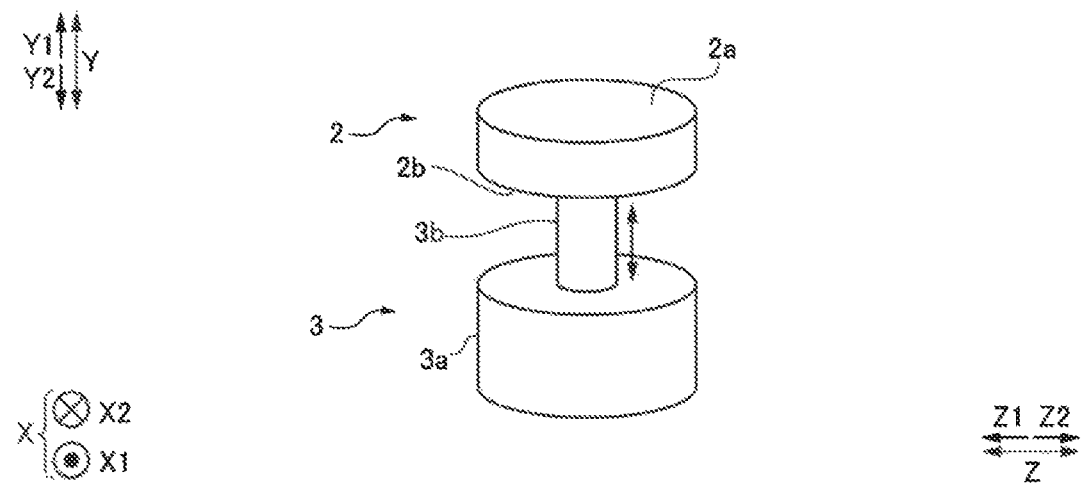
FIG. 4 is a schematic diagram of a position switching mechanism.

As shown in FIG. 4, the subject holding unit 2 has a cylindrical shape. A holding surface 2a on which the subject 90 is held is provided on an end surface of the subject holding unit 2 on one side (Y1-direction side) in the Y-direction. A connecting surface 2b connected to the position switching mechanism 3 is provided on an end surface of the subject holding unit 2 on the other side (Y2-direction side) in the Y-direction.

As shown in FIG. 4, the position switching mechanism 3 includes a main body portion 3a and a moving portion 3b. The main body portion 3a is configured to hold the moving portion 3b in the Y2-direction. In the moving portion 3b, one end surface (Y2-direction side) in the Y-direction is connected to the main body portion 3a, and the other end surface (Y1-direction side) is connected to the connecting surface 2b of the subject holding unit 2. The moving portion 3b is configured to be movable (expandable and contractible) in the Y-direction by a drive unit (not shown). That is, the position switching mechanism 3 in this embodiment is configured to switch between the retracted position 60 and the imaging position 61 by moving the subject holding unit 2. Specifically, the position switching mechanism 3 is configured to switch between the retracted position 60 and the imaging position 61 by moving the subject holding unit 2 in the up-down direction (Y-direction).

(Retracted Position and Imaging Position)

Next, referring to FIG. 5 and FIG. 6, the retracted position 60 and the imaging position 61 will be described.

Figure 5:
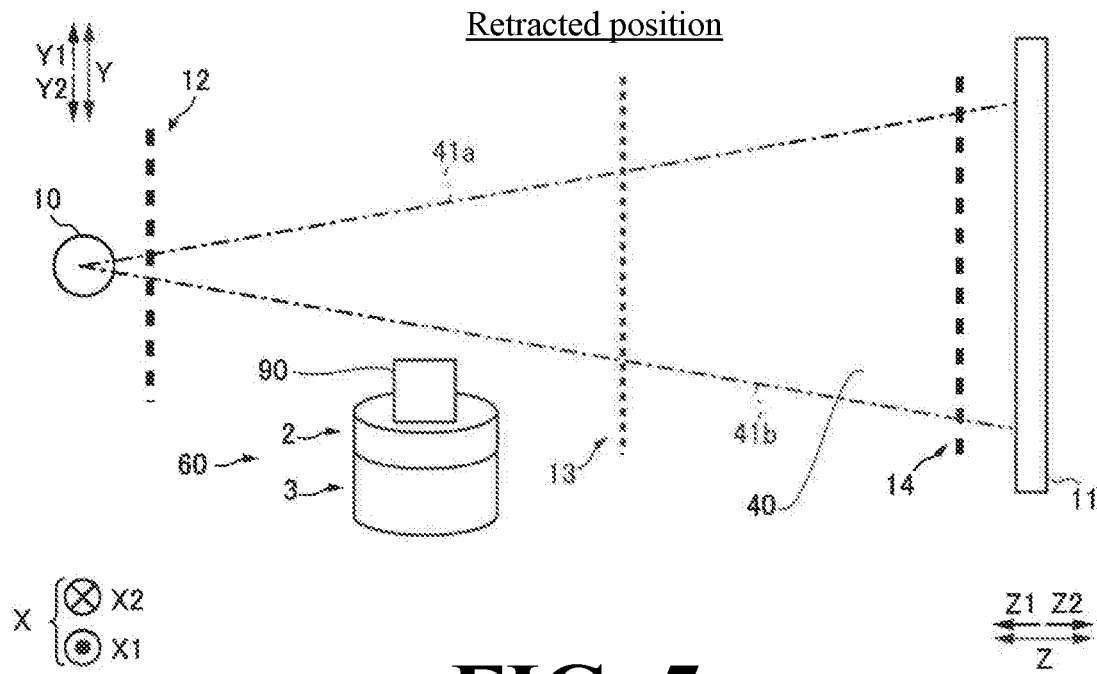
FIG. 5 is a diagram for explaining a retracted position.

As shown in FIG. 5, the retracted position 60 is a position where the position of the subject 90 is outside the region to be imaged 40 of the detector 11. In this embodiment, the region to be imaged 40 is a region determined by the X-ray source 10, the detector 11, and the X-rays emitted from the X-ray source 10. In the case shown in FIG. 5, the X-rays are irradiated in the regions indicated by the dashed-dotted line 41a and the dashed-dotted line 41b. Therefore, the region determined by the X-ray source 10, the detector 11, and the dashed-dotted line 41a, and the dashed-dotted line 41b is the region to be imaged 40.

In this embodiment, the position switching mechanism 3 moves the subject 90 to the retracted position 60 by moving the subject holding unit 2 in the Y2-direction.

Figure 6:
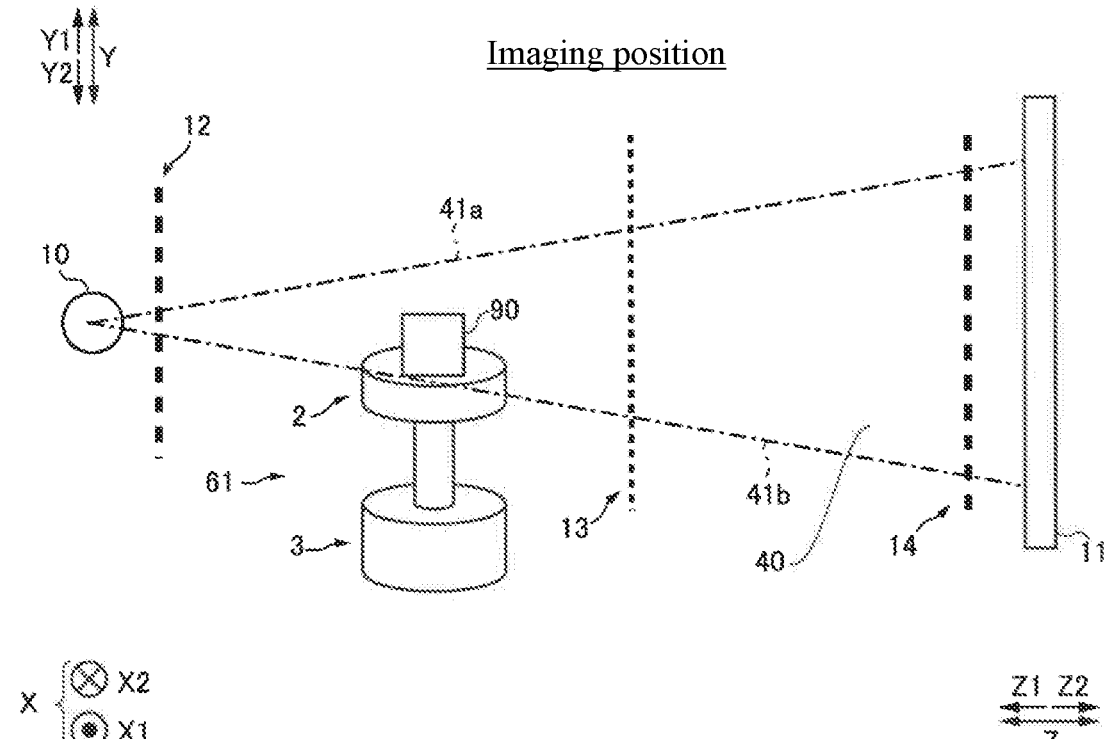
FIG. 6 is a diagram for explaining an imaging position.

As shown in FIG. 6, the imaging position 61 is a position where the subject 90 is in the region to be imaged 40 of the detector 11. In this embodiment, the position switching mechanism 3 moves the subject 90 in the Y1-direction, thereby moving the subject 90 to the imaging position 61. Note that the position switching mechanism 3 switches between the retracted position 60 and the imaging position 61 by moving the subject 90 in the Y-direction. That is, the retracted position 60 and the imaging position 61 have the same positions in the X-direction and in the Z-direction, and the positions in the Y-direction differ from each other.

(X-Ray Phase-Contrast Image)

Next, referring to FIG. 7 to FIG. 9, a configuration in which the image processing unit 4 generates the X-ray phase contrast image 20 will be described.

Figure 7:
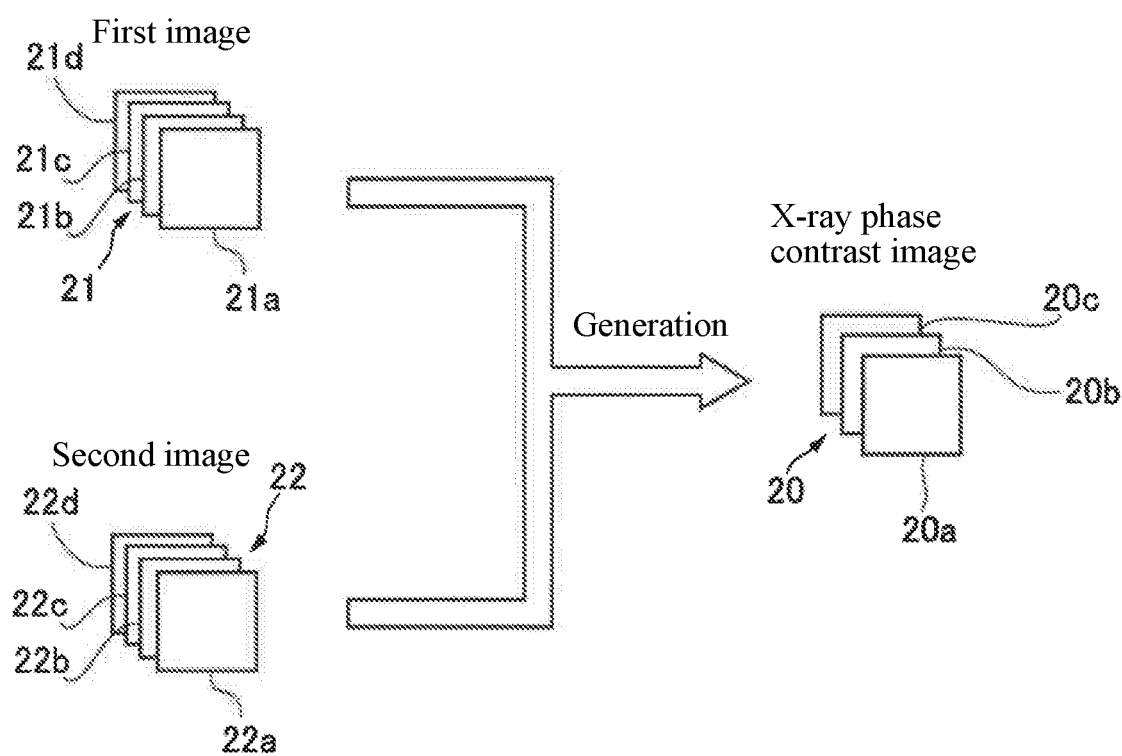
FIG. 7 is a schematic diagram for explaining a configuration for generating an X-ray phase contrast image.
Figure 8:
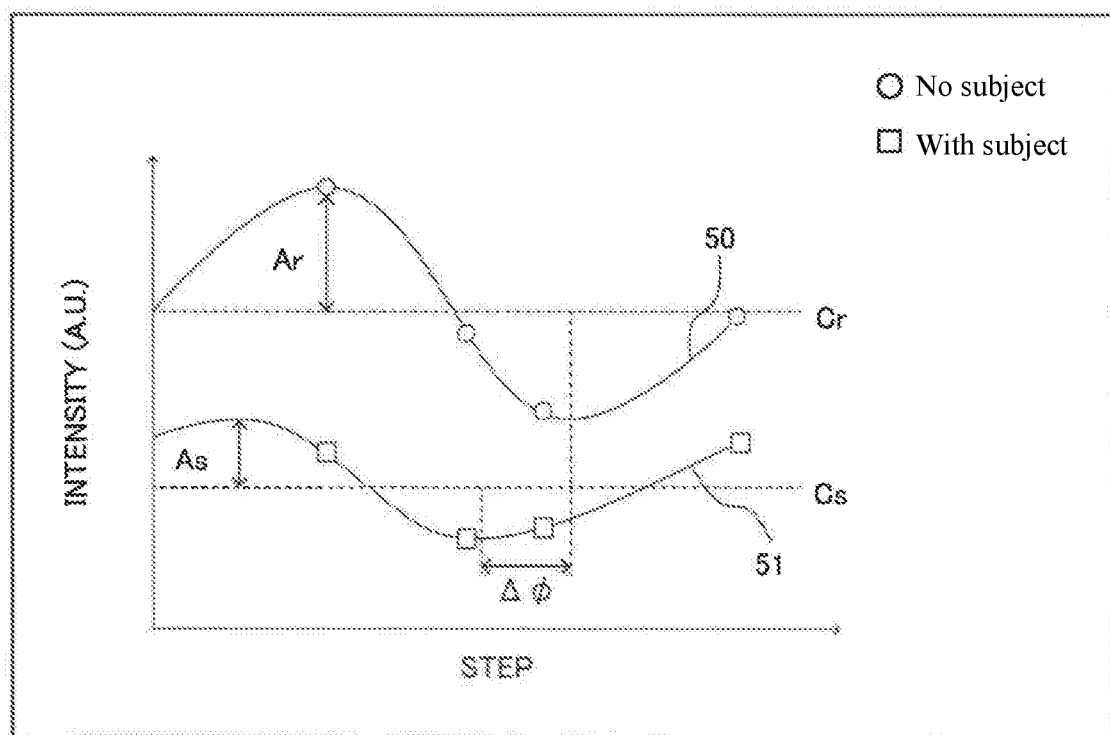
FIG. 8 is a diagram for explaining a method of acquiring an intensity change curve.

As shown in FIG. 7, in the X-ray phase imaging apparatus 100 by this embodiment, a first image 21 and a second image 22 are captured. The first image 21 is an image captured at the retracted position 60. The second image 22 is an image captured at the imaging position 61.

In this embodiment, the image processing unit 4 is configured to generate the absorption image 20a, the phase differential image 20b, and the dark field image 20c, as an X-ray phase contrast image 20. The image processing unit 4 generates an X-ray phase contrast image 20 by a so-called fringe scan method in which an image is captured while the second grating 13 is being translated by the grating position adjustment mechanism 8. Therefore, the first image 21 and the second image 22 are acquired by the number of times of translating the second grating 13. In this embodiment, the number of translating the second grating 13 is, for example, four. In the example shown in FIG. 7, as the first image 21, four images of a first image 21a, a first image 21b, a first image 21c, and a first image 21d corresponding to the respective translational positions are captured. As to the second image 22, four images of a second image 22a, a second image 22b, a second image 22c, and a second image 22d corresponding to the respective translational positions are captured. The image processing unit 4 acquires an intensity change curve 50 (see FIG. 8) and an intensity change curve 51 (see FIG. 8) indicating a change in pixel value from the pixel value of a predetermined pixel among the plurality of first images 21 and the plurality of second images 22 that are captured while being translated. It should be noted that the intensity change curve 50 and the intensity change curve 51 are acquired in all the pixels of the first image 21 and the second image 22.

Next, referring to FIG. 8, the configuration for generating the X-ray phase contrast image 20 (the absorption image 20a, the phase differential image 20b, and the dark field image 20c) by using the acquired intensity change curve 50 and the intensity change curve 51 will be described. In the intensity change curve 50 and the intensity change curve 51 shown in FIG. 8, the vertical axis represents the signal strength, and the horizontal axis represents the step number (the number of translations).

The absorption image 20a can be generated by the following equation (1). The phase differential image 20b can be generated by the following equation (2). The dark field image 20c can be generated by the following equation (3).

$$\text{Absorption image} = Cs/Cr \quad (1)$$

$$\text{Phase differential image} = \text{const} \cdot \Delta\varphi \quad (2)$$

$$\text{Dark field image} = Vs/Vr = (As/Cs)/(Ar/Cr) \quad (3)$$

Where Cr is the mean strength of the X-rays of the first image 21. Cs is the mean strength of the X-rays of the second image 22. The const is a constant obtained by a predetermined calculation. In addition, $\Delta\varphi$ is a phase difference between the intensity change curve 50 acquired from the first image 21 and the intensity change curve 51 acquired from the second image 22. Vr is the visibility of the intensity change curve 50 obtained from the first image 21. Vs is the visibility (Vs) of the intensity change curve 51 acquired from the second image 22. Ar is the amplitude of the intensity change curve 50 acquired from the first image 21. As is the amplitude of the intensity change curve 51 acquired from the second image 22.

Figure 9:
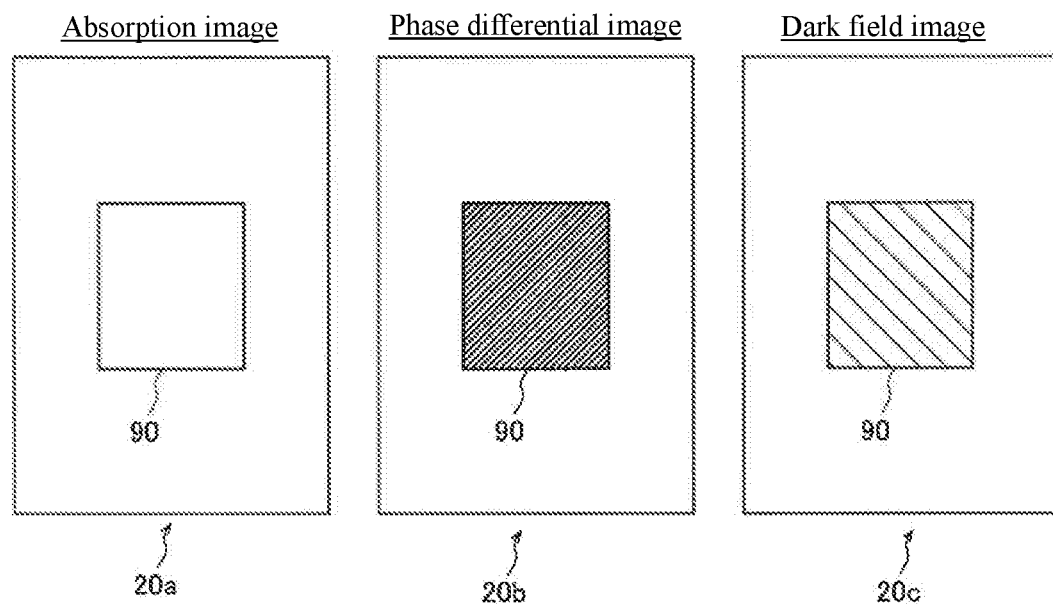
FIG. 9 is a schematic diagram for explaining an absorption image, a phase differential image, and a dark field image.

FIG. 9 is a schematic diagram of the X-ray phase contrast image 20. The absorption image 20a is an image captured based on the change in the intensity of the X-rays detected by the detector 11 due to the fact that X-rays are absorbed by the subject 90 as the X-rays pass through the subject 90. The phase differential image 20b is an image obtained by imaging the inner structure of the subject 90 based on the phase shift of the X-rays generated when the X-rays pass through the subject 90. In addition, the dark field image 20c is an image obtained by imaging the inner structure of the subject 90 based on the scattering of the minute angle of the X-rays generated when the X-rays pass through the subject 90.

Here, the X-ray phase contrast image 20 is an image obtained based on the change in the X-rays by the subject 90 in the first image 21 captured at the retracted position 60 and the second image 22 captured at the imaging position 61.

Figure 10:
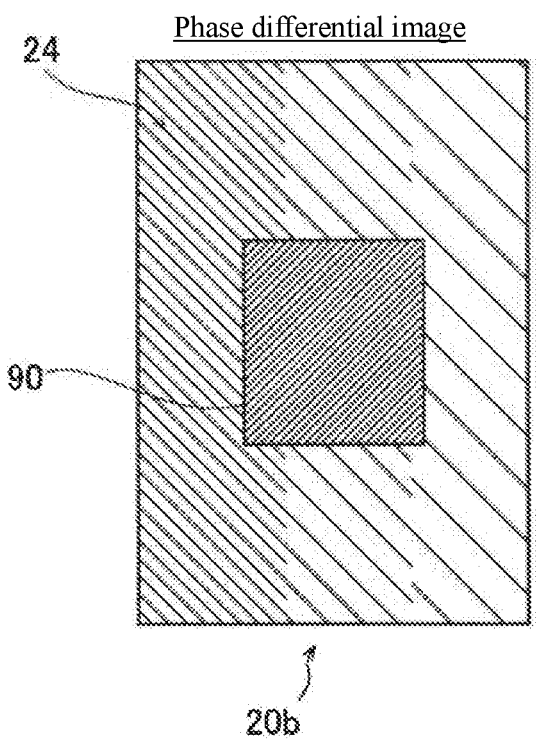
FIG. 10 is a schematic diagram for explaining artifacts occurring at a background portion of the X-ray phase contrast image.

In this embodiment, the image processing unit 4 is configured to generate the X-ray phase contrast image 20 based on the first image 21 and the second image 22 stored in the storage unit 6. Specifically, the subject 90 is moved to the retracted position 60, and the first image 21 which has been captured in advance is stored in the storage unit 6. Thereafter, the subject 90 is moved to the imaging position 61, and the second image 22 is captured. After capturing the second image 22, the X-ray phase contrast image 20 is generated by using the second image 22 and the first image 21 previously captured and stored in the storage unit 6. Therefore, when the relative position of a plurality of gratings deviates between the capturing of the first image 21 and the capturing the second image 22 due to thermal expansion of the grating by the heat generated from the X-ray source 10, vibrations of the grating, or the like, a change occurs at the relative position of the grating at the time of capturing the first image 21 stored in the storage unit 6 and at the relative position of the grating of capturing the second image 22. When a change occurs in the relative position of the gratings, a change other than a change due to the subject 90 occurs in the moiré fringe in the first image 21 and the moiré fringe in the second image 22. In this case, as shown in FIG. 10, a gradation-like artifact 24 is generated on the background portion of the generated X-ray phase contrast image 20. In FIG. 10, although the phase differential image 20b is illustrated as the X-ray phase contrast image 20 for convenience, the gradation-like artifact 24 also occurs in the absorption image 20a and the dark field image 20c.

By suppressing a change other than a change caused by the subject 90 in the moiré fringe in the first image 21 and the moiré fringe in the second image 22, it is possible to suppress the occurrence of the artifact 24 in the X-ray phase contrast image 20. That is, by updating the first image 21 stored in the storage unit 6, it is possible to suppress the occurrence of the artifact 24 in the X-ray phase contrast image 20.

In order to capture the first image 21, it is necessary to perform imaging in a state in which the subject 90 is not arranged. In cases where an operator removes the subject 90 and performs capturing of the first image 21, it is necessary to arrange the subject 90 again after capturing the first image 21 in order to capture the second image 22, which imposes a burden on the operator.

(Switching Between Retracted Position and Imaging Position)

Therefore, in this embodiment, the control unit 5 controls the position switching mechanism 3 to switch between the retracted position 60 and the imaging position 61 while holding the subject 90 on the subject holding unit 2.

In this embodiment, as a sequence of operations, the control unit 5 is configured to control executing imaging at the retracted position 60 and imaging at the imaging position 61. More specifically, the control unit 5 is configured to control executing imaging at the retracted position 60 and imaging at the imaging position 61 on the basis of one operation input signal. For example, when the operator presses an imaging start button, imaging at the retracted position 60 and imaging at the imaging position 61 are executed. In addition, the control unit 5 is configured to control executing moving to the retracted position 60 and imaging at the retracted position 60 and moving to the imaging position 61 and imaging at the imaging position 61, as a sequence of operations in a state in which the X-rays are being emitted from the X-ray source 10.

(Imaging Mode)

In this embodiment, the control unit 5 is configured to control switching between a first imaging mode for updating the first image 21 stored in the storage unit 6 and a second imaging mode for updating the first image 21 stored in the storage unit 6 based on a determination based on a pixel value of the background portion of the X-ray phase contrast image 20, or based on an operation input by an operator, every time of capturing the second image 22, every predetermined number of times of capturing the second image 22, or every random number of times of capturing the second image 22.

More specifically, the control unit 5 is configured to switch between the first imaging mode and the second imaging mode on the basis of an operation input by an operator selecting the imaging mode. The operation input by which the operator selects the imaging mode includes, for example, pressing of an imaging mode selection button by the operator. This embodiment is a configuration for performing imaging by the control unit 5 when the first imaging mode is selected. The aforementioned "updating the first image 21 every predetermined number of times of capturing the second image 22 or every random number of times of capturing the second image 22" means, for example, updating the first image 21 every time the second image 22 is captured two times, three times, or the like.

(Correction by Third Image)

As shown in FIG. 11, in this embodiment, the image processing unit 4 is configured to generate a third image 23. The third image 23 is an image for removing noises 23a caused by the imaging system 1. The noises 23a caused by the imaging system 1 include noises caused by the pixel loss of the detector 11. As shown in FIG. 11, the image processing unit 4 is configured to remove noises 23a from the X-ray phase contrast image 20 based on the generated third image 23.

Specifically, the image processing unit 4 is configured to remove the noises 23a caused by the imaging system 1 by subtracting the third image 23 from the X-ray phase contrast image 20. In the example shown in FIG. 11, the phase differential image 20b is used for the sake of convenience, but noises 23a also occur in the absorption image 20a and the dark field image 20c. Therefore, the image processing unit 4 is configured to remove noises 23a of the absorption image 20a and the dark field image 20c based on the third images 23.

In this embodiment, the control unit 5 is configured to control the position switching mechanism 3 to move the subject holding unit 2 to the retracted position 60 when capturing the third image 23 and to move the subject holding unit 2 to the imaging position 61 after capturing the third image 23. Further, the control unit 5 moves the plurality of gratings to the outside of the region to be imaged 40 by controlling the drive unit 9a when capturing the third images 23. As a result, the third image 23 including noises 23a caused by the X-ray source 10 and detector 11 can be obtained.

(X-Ray Phase-Contrast Image Generation Flow)

Figure 12:
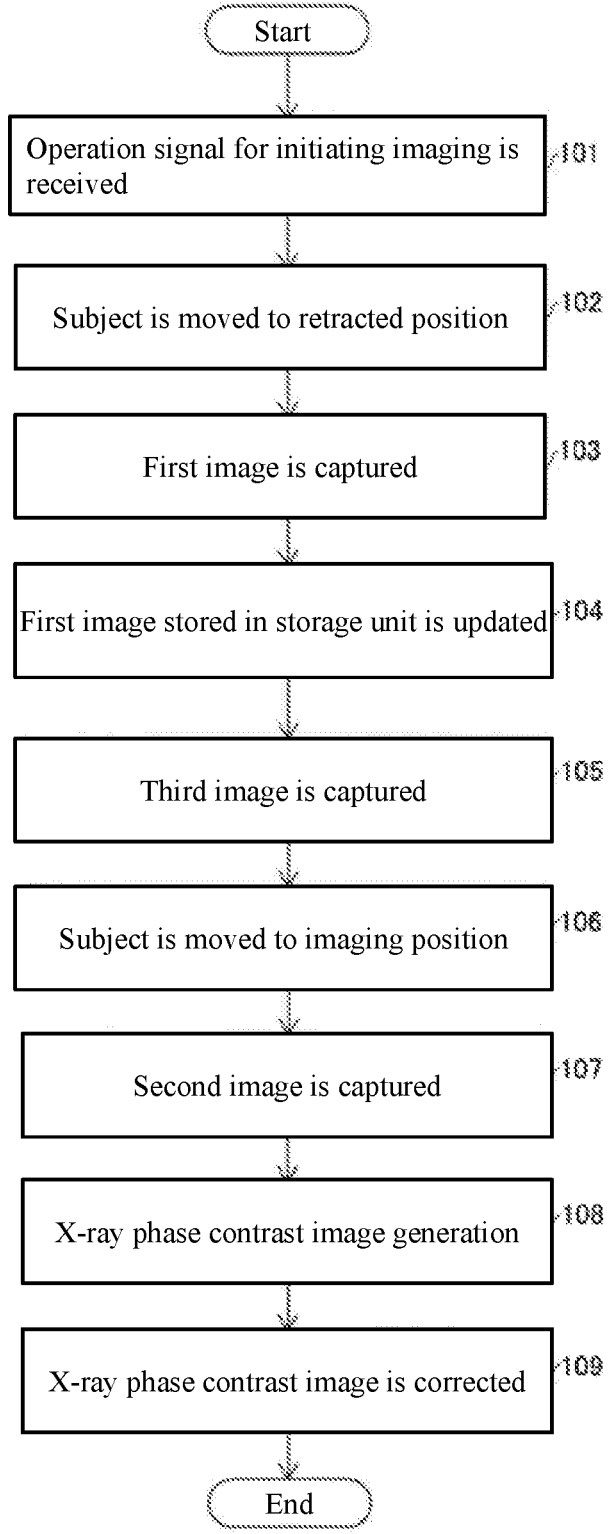
FIG. 12 is a flowchart for explaining the process of generating an X-ray phase contrast image.

Next, referring to FIG. 12, a flow in which the X-ray phase imaging apparatus 100 generates the X-ray phase contrast image 20 will be described.

In Step 101, the control unit 5 receives an operation signal for starting imaging. The process of Step 101 is executed by an operator by performing an operation of starting the imaging operation after the subject 90 is arranged. The operator sets the imaging condition, selects the imaging mode, and the like, prior to performing an operation for starting imaging. The flow shown in FIG. 12 is a process flow when the first imaging mode is selected. The imaging condition includes the intensity of the irradiated X-rays, the duration of the irradiation, and the like.

In Step 102, the control unit 5 controls the position switching mechanism 3 to move the subject 90 to the retracted position 60. Specifically, the control unit 5 controls the position switching mechanism 3 to move the subject holding unit 2 in the Y2-direction, thereby moving the subject 90 to the retracted position 60.

In Step 103, the control unit 5 controls capturing the first image 21. Prior to performing the process of Step 103, the control unit 5 adjusts the position of the second grating 13 to perform the positional adjustments of the plurality of gratings.

In Step 104, the control unit 5 updates the first image 21 stored in the storage unit 6 by the first image 21 captured in Step 103.

In Step 105, the control unit 5 controls capturing the third images 23. Specifically, the control unit 5 moves the plurality of gratings to the outer side of the region to be imaged 40 by controlling the drive unit 9a. After that, the control unit 5 controls capturing the third images 23. In addition, the control unit 5 controls storing the captured third images 23 in the storage unit 6. After capturing the third images 23, the control unit 5 moves the plurality of gratings into the region to be imaged 40 by controlling the drive unit 9a.

In Step 106, the control unit 5 controls the position switching mechanism 3 to move the subject 90 to the imaging position 61. Specifically, the control unit 5 controls the position switching mechanism 3 to move the subject holding unit 2 in the Y1-direction, thereby moving the subject 90 to the imaging position 61.

In Step 107, the control unit 5 controls capturing the image of the second image 22.

In Step 108, the image processing unit 4 generates the X-ray phase contrast image 20 based on the first image 21 and the second image 22.

In Step 109, the image processing unit 4 corrects the generated X-ray phase contrast image 20 based on the third image 23.

The processes of Step 101 to Step 109 are executed as a sequence of operations. Specifically, the processes of Step 101 to 109 are executed on the basis of one operation input signal. That is, unlike the configuration in which an operator performs the removal and mounting operations of the subject 90, Step 103 for capturing the first image 21 and Step 107 for capturing the second image 22 are executed as a sequence of operations based on one operation input signal.

It should be noted that the aforementioned "executing as a sequence of operations based on one operation input signal" means "automatically executing the processes of Step 103 and Step 107 in response to a single operation input signal without requiring any other operation input signals." The operation input signal described herein may correspond to an input from an operator. Thus, in response to a single operation input signal input to the X-ray phase imaging apparatus (without requiring any further operation input signals to be provided by an operator), the processes of Step 103 and Step 107 may be performed. The process in Step 105 need not be performed every time. Since the noises 23a caused by the imaging system 1 generally do not change so much, when the process of Step 105 is performed once, the process of Step 105 may be omitted during later operations. When the process of Step 105 is omitted, the process of Step 109 may be performed by the third image 23 stored in the storage unit 6.

(Effects of this Embodiment)

In this embodiment, the following effects can be obtained.

In this embodiment, as described above, the X-ray phase imaging apparatus 100 includes an imaging system 1 including an X-ray source 10, a detector 11 for detecting X-rays emitted from the X-ray source 10, and a plurality of gratings arranged between the X-ray source 10 and the detector 11; a subject holding unit 2 configured to hold a subject 90; a position switching mechanism 3 configured to switch a retracted position 60 in which a position of the subject 90 is out of a region to be imaged by the detector 11 and an imaging position in which the position of the subject 90 is within the region to be imaged by the detector 11 by changing a relative position between the subject holding unit 2 and the imaging system 1; a control unit 5 configured to control switching between the retracted position 60 and the imaging position 61 by the position switching mechanism 3; and an image processing unit 4 configured to generate an X-ray phase contrast image 20 based on a first image 21 captured at the retracted position 60 and a second image 22 captured at the imaging position 61, wherein the control unit 5 is configured to control sequentially imaging at the retracted position 60 and imaging at the imaging position 61.

As a result, since the retracted position 60 and the imaging position 61 are switched by the position switching mechanism 3, the first image 21 can be captured at the retracted position 60 without the operator's removal of the subject 90. In addition, by executing the image capturing at the retracted position 60 and the image capturing at the imaging position 61 as a sequence of operations, it is possible to suppress an increase in the length in time between the image capturing at the retracted position 60 and the image capturing at the imaging position 61, so that it is possible to suppress the occurrence of the positional deviation of the gratings. As a result, it is possible to provide the X-ray phase imaging apparatus 100 capable of suppressing the occurrence of the artifact 24 in the generated X-ray phase contrast image 20 while reducing the burden on the operator.

In addition, in this embodiment, as described above, the position switching mechanism 3 is configured to switch between the retracted position 60 and the imaging position 61 by moving the subject holding unit 2, and the control unit 5 is configured to control imaging at the retracted position 60 and performing imaging at the imaging position 61 based on one operation input signal. As a result, it is possible to suppress the complexity of the device configuration as compared with the configuration in which the imaging system 1 is moved. In addition, since the imaging at the retracted position 60 and the imaging at the imaging position 61 are performed based on one operation input signal, the number of operations performed by the operator can be reduced as compared with a configuration in which the imaging of the first image 21 and the imaging of the second image 22 are performed based on an individual operation input signal. As a result, the burden on the operator can be reduced. Further, since an operation input is not required between the imaging of the first image 21 and the imaging of the second image 22, it is possible to suppress an increase in the time between the imaging of the first image 21 and the imaging of the second image 22, for example, the operator forgets the operation of starting the imaging of the second image 22. As a result, it is possible to suppress an increase in the positional deviation of the gratings at the time of capturing the first image 21 and at the time of capturing the second image 22, so that it is possible to suppress degradation of the image quality of the X-ray phase contrast image 20.

In addition, in this embodiment, as described above, the control unit 5 is configured to control executing moving to the retracted position 60 and imaging at the retracted position 60 and moving to the imaging position 61 and imaging at the imaging position 61, as a sequence of operations in a state in which the X-rays is being emitted from the X-ray source 10. Here, when the operator removes the subject 90 in order to capture the first image 21, it is preferable to turn off the power of the X-ray source 10 in order to prevent the X-rays from being erroneously emitted while the subject 90 is being removed.

However, when the X-ray source 10 is energized after the power of the X-ray source 10 is turned off, it takes a predetermined amount of time for the X-ray source 10 to stabilize. If the X-rays are emitted prior to the lapse of a predetermined period of time, the X-rays emitted in the middle of imaging change, so that the image quality of the X-ray phase contrast image 20 deteriorates.

Therefore, in this embodiment, in a state in which the X-rays are being emitted from the X-ray source 10, by configuring the control unit 5 to execute moving to the retracted position 60 and imaging at the retracted position 60 and moving to the imaging position 61 and imaging at the imaging position 61 as a sequence of operations, the moving to the retracted position 60 and the capturing of the first image 21 can be executed without turning off the power of the X-ray source 10.

As a result, unlike the configuration in which the subject 90 is moved to the retracted position 60 in a state in which the power of the X-ray source 10 is turned off, it becomes possible to perform imaging without waiting until the X-ray source 10 becomes stabilized. Therefore, the imaging time can be shortened. In addition, unlike the configuration in which the subject 90 is moved to the retracted position 60 in a state in which the power of the X-ray source 10 is turned off, it is possible to suppress a change in the X-rays to be emitted in the middle of imaging, so that it is possible to suppress degradation of the image quality of the X-ray phase contrast image 20.

Further, in this embodiment, as described above, the control unit 5 is configured to control switching between the first imaging mode for updating the first image 21 stored in the storage unit 6 and the second imaging mode for updating the first image 21 stored in the storage unit 6 based on a judgement based on the pixel values of the background portion of the X-ray phase contrast image 20 or based on the operation input by the operator, every time the second image 22 is captured, every predetermined number of times the second image 22 is captured, or every random number of times the second image 22 is captured.

As a result, when performing imaging by the first imaging mode, the first image 21 is updated every time imaging is performed, every predetermined number of times, or every random number of times, so that it is possible to suppress the occurrence of positional deviation of the plurality of gratings between after imaging of the first image 21 and until imaging of the second image 22. As a result, it is possible to easily suppress the occurrence of the artifact 24 in the X-ray phase contrast image 20 to be generated. Further, in the case of performing imaging by the second imaging mode, the first image 21 is updated as required, so the imaging time can be shortened as compared with a configuration in which the first image 21 is updated every time imaging is performed.

Further, in this embodiment, as described above, the image processing unit 4 is configured to generate the third image 23 for removing the noise 23a caused by the imaging system 1 and to remove the noises 23a from the X-ray phase contrast image 20 based on the generated third image 23. The control unit 5 is configured to control moving the subject holding unit 2 to the retracted position 60 by the position switching mechanism 3 and moving the subject holding unit 2 to the imaging position 61 after capturing the third image 23 when capturing the third image 23. With this, even in the case of capturing the third image 23 for removing the noises 23a caused by the imaging system 1, the third image 23 can be captured without removing and attaching the subject 90 by the operator. As a result, it is possible to further suppress the degradation of the image quality of the X-ray phase contrast image 20 while further reducing the burden on the operator.

Further, in this embodiment, as described above, it further includes the imaging system holding unit 9 extending in the optical axis direction of the X-rays and holding at least the plurality of gratings suspended from above, and the position switching mechanism 3 is configured to switch between the retracted position 60 and the imaging position 61 by moving the subject holding unit 2 in the up-down direction. With this, for example, by providing the position switching mechanism 3 at the bottom of the apparatus, it is possible to suppress the imaging system holding unit 9 and the position switching mechanism 3 from interfering with each other. As a result, even in the case of switching the subject holding unit 2 between the retracted position 60 and the imaging position 61 by the position switching mechanism 3, it is possible to suppress the complication of the device configuration.

Further, in this embodiment, as described above, the X-ray phase contrast image generation method includes: a step 102 of moving a subject 90 to a retracted position 60 in which a position of the subject 90 is out of a region to be imaged by relatively moving the imaging system 1 including the X-ray source 10, the detector 11 for detecting X-rays emitted from the X-ray source 10, and a plurality of gratings arranged between the X-ray source 10 and the detector 11 and a subject holding unit for holding the subject 90; a step 103 of capturing the first image at the retracted position 60; a step 106 of relatively moving the subject holding unit 2 and the imaging system 1 to the imaging position 61 where the position of the subject 90 is within the region to be imaged by the detector 11; a step 107 of capturing the second image 22 at the imaging position 61; and a step 108 of generating the X-ray phase contrast image 20 based on the first image 21 and the second image 22, wherein the step 103 of capturing the first image 21 and the step 107 of capturing the second image 22 are performed as a sequence of operations.

As a result, similarly to the X-ray phase imaging apparatus 100, it is possible to provide an X-ray phase contrast image generation method capable of suppressing the occurrence of the artifact 24 in the generated X-ray phase contrast image 20 while reducing the burden on the operator.

In addition, in this embodiment, as described above, Step 102 of moving to the retracted position 60 and Step 106 of moving to the imaging position 61 are executed by moving the subject holding unit 2, and Step 103 of capturing the first image 21 at the retracted position 60 and Step 107 of capturing the second image 22 at the imaging position 61 are executed on the basis of one operation input signal. As a result, the number of operations performed by the operator can be reduced as compared with a configuration in which the capturing of the first image 21 and the capturing of the second image 22 are performed on the basis of respective operation input signals.

As a result, it is possible to provide an X-ray phase contrast image generation method capable of reducing the burden on the operator. In addition, since an operation input is not required between the capturing of the first image 21 and the capturing of the second image 22, it is possible to suppress the interval between the capturing of the first image 21 and the capturing of the second image 22 from becoming longer, for example, the operator forgets the operation of starting the capturing of the second image 22. As a result, it is possible to suppress an increase in the positional deviation of the gratings at the time of capturing the first image 21 and at the time of capturing the second image 22, and therefore it is possible to provide an X-ray phase contrast image generation method capable of suppressing degradation of the image quality of the X-ray phase contrast image 20.

MODIFIED EXAMPLES

It should be noted that the embodiments disclosed herein are to be considered in all respects as illustrative and not restrictive. The scope of the present invention is indicated by claims rather than by the above description of the embodiments and includes all modifications (modified examples) within the meaning and range equivalent to the claims.

First Modified Example

For example, in the above embodiment, an example of a configuration in which the control unit 5 performs imaging by the first imaging mode has been described, but the present invention is not limited to this configuration. For example, the control unit 5 may be configured to perform imaging by the second imaging mode. In the first modified example, the control unit 5 is configured to control updating the first image 21 based on a determination based on the pixel value of the background portion of the X-ray phase contrast image 20 in the second imaging mode. Specifically, the control unit 5 is configured to determine whether or not to update the first image 21 stored in the storage unit 6 based on the pixel value of the background portion of the X-ray phase contrast image 20. In the case of updating the first image 21, the control unit 5 is configured to control capturing the first image 21 at the retracted position 60.

Here, it is determined that the first image 21 is updated based on the pixel value of the background portion of the X-ray phase contrast image 20 when the position of the grating is shifted. Therefore, the control unit 5 is configured to perform the positional adjustment of the plurality of gratings by the grating position adjustment mechanism 8 when updating the first image 21 stored in the storage unit 6. Since the positional adjustments of the plurality of gratings are the same as those in the above embodiment, detailed descriptions thereof are omitted. The control unit 5 is configured to perform capturing of the first image 21 and updating of the first image 21 stored in the storage unit 6 after performing the positional adjustments of the plurality of gratings.

Figure 13:
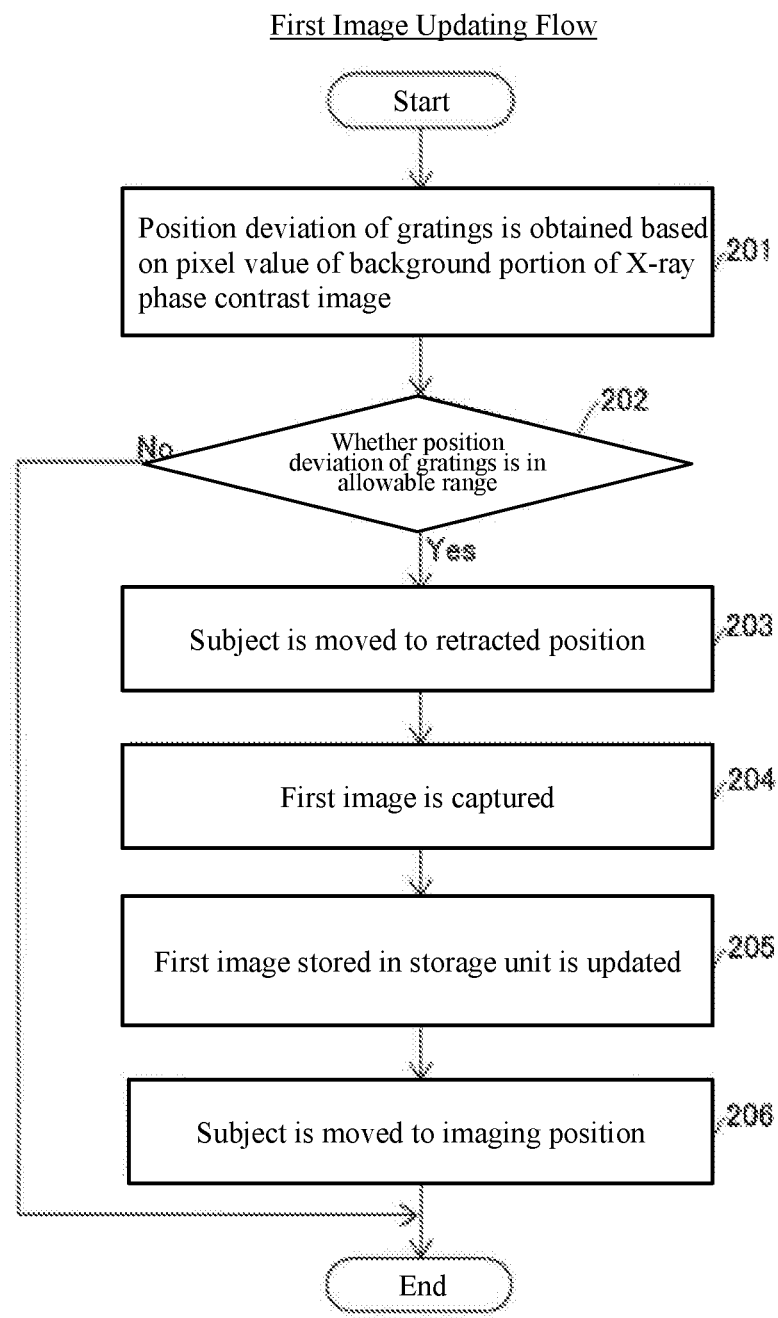
FIG. 13 is a flowchart for explaining the process of updating the first image by a first modified example.

Referring to FIG. 13, a flow of updating the first image 21 will be described.

In Step 201, the control unit 5 determines whether or not a positional deviation has occurred in the gratings based on the pixel value of the background portion of the X-ray phase contrast image 20. The control unit 5 compares, for example, the pixel value of the background portion of the X-ray phase contrast image 20 with a predetermined value to determine whether or not a positional deviation has occurred in the gratings. The process of Step 201 is initiated after the generation of the X-ray phase contrast image 20 by the image processing unit 4.

In Step 202, the control unit 5 determines whether or not the positional deviation of the grating is within an allowable range. When the positional deviation of the grating exceeds the tolerance, the process proceeds to Step 203. When the positional deviation of the grating is within the allowable range, the process ends.

In Step 203, the control unit 5 controls the position switching mechanism 3 to move the subject 90 to the retracted position 60.

In Step 204, the control unit 5 controls imaging the first image 21.

In Step 205, the control unit 5 updates the first image 21 stored in the storage unit 6 by the first image 21 captured in Step 204.

In Step 206, the control unit 5 controls the position switching mechanism 3 to move the subject 90 to the imaging position 61. Thereafter, the process ends.

Prior to the process of Step 201, the operator switches the imaging mode. Specifically, the operator selects which imaging mode of the first imaging mode and the second imaging mode is to be used for imaging. The control unit 5 performs a process of switching the imaging mode based on the selection by the operator. When the operator presses the first imaging mode button, the control unit 5 switches the imaging mode to the first imaging mode. When the operator presses the second imaging mode buttons, the control unit 5 switches the imaging mode to the second imaging mode. The first modified example is a configuration in which the control unit 5 updates the first image 21 when the operator selects the second imaging mode.

As described above, by configuring such that it is determined whether or not to update the first image 21 on the basis of the pixel value of the background portion of the X-ray phase contrast image 20, it is determined whether or not to update the first image 21 on the basis of the pixel value of the background portion of the X-ray phase contrast image 20. Therefore, the operator can update the first image 21 without determining whether or not to update the first image 21. As a result, the first image 21 can be easily updated while reducing the burden on the operator.

Further, as described above, by configuring such that the updating process of the first image 21 is performed after performing the positional adjustment of the plurality of gratings, since the first image 21 is captured after adjusting the positional deviation of the plurality of gratings, the first image 21 captured while suppressing the positional deviation of the plurality of gratings can be stored in the storage unit 6 at the time of capturing the first image 21 and at the time of capturing the second image 22. As a result, the positional deviation of the plurality of gratings is suppressed at the time of capturing the first image 21 and the time of capturing the second image 22, which are used to generate the X-ray phase contrast image 20, so that it is possible to suppress the occurrence of the artifact 24 in the X-ray phase contrast image 20.

Further, as described above, since the first image 21 is updated as required by performing imaging by the second imaging mode for updating the first image 21 stored in the storage unit 6 based on the determination based on the pixel value of the background portion of the X-ray phase contrast image 20, the imaging time can be shortened as compared with the configuration in which the first image 21 is updated each time imaging is performed.

Modified Example 2

In the above embodiment, an example is shown in which the control unit 5 performs imaging by the first imaging mode, but the present invention is not limited to this configuration. For example, the control unit 5 may be configured to perform imaging by the second imaging mode. In the second modified example, the control unit 5 is configured to control updating the first image 21 based on the operation input by the operator in the second imaging mode.

Figure 14:
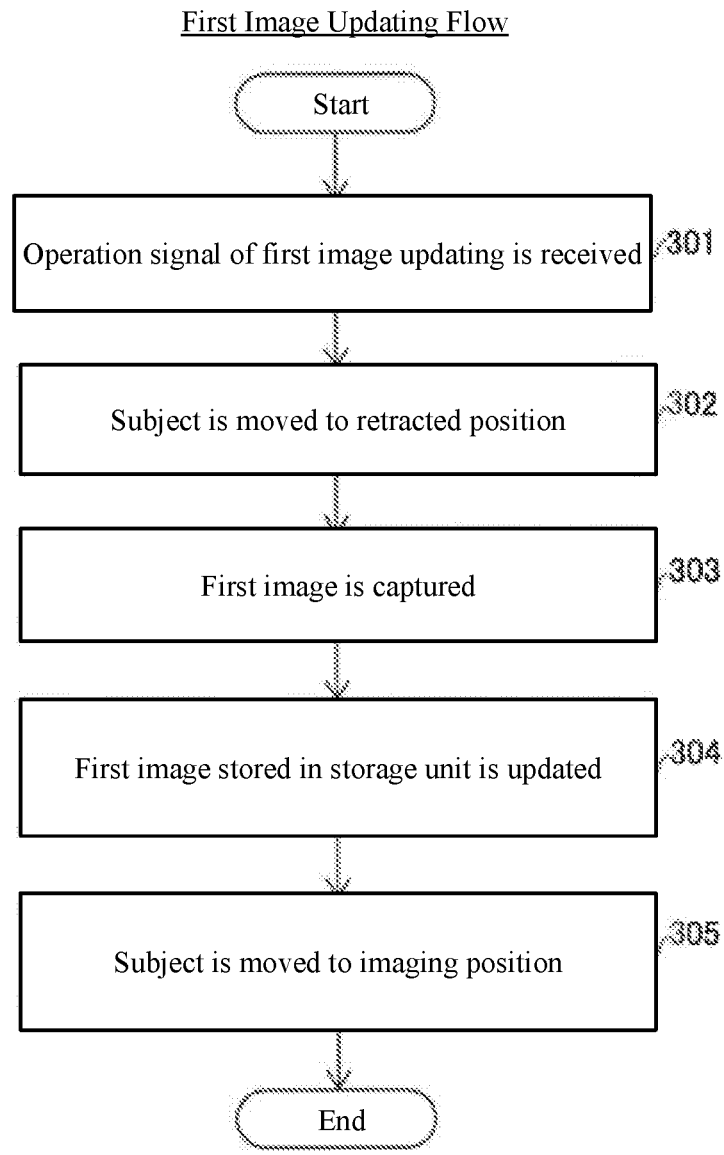
FIG. 14 is a flowchart for explaining the process of updating the first image by a second modified example.

Referring to FIG. 14, a flow of updating the first image 21 will be described.

In Step 301, the control unit 5 receives an operating signal for updating the first image 21. The process of Step 301 is initiated when the operator performs the update operation of the first image 21. The update process of the first image 21 by the second modified example is a process executed by, for example, pressing a first image update button in order for the operator to update the first image 21 at the time of imaging by the embodiment. That is, when the operator does not perform the updating process of the first image 21, the image capturing by the embodiment is performed.

In Step 302, the control unit 5 controls the position switching mechanism 3 to move the subject 90 to the retracted position 60.

In Step 303, the control unit 5 controls capturing the first image 21.

In Step 304, the control unit 5 updates the first image 21 stored in the storage unit 6 by the first image 21 captured in Step 303.

In Step 305, the control unit 5 controls the position switching mechanism 3 to move the subject 90 to the imaging position 61. Thereafter, the process ends.

As described above, since the operator can update the first image 21 at any time by imaging with the second imaging mode for updating the first image 21 stored in the storage unit 6 based on the operator's operation inputs, the convenience of the operator can be improved.

Modified Example 3

Figure 15:
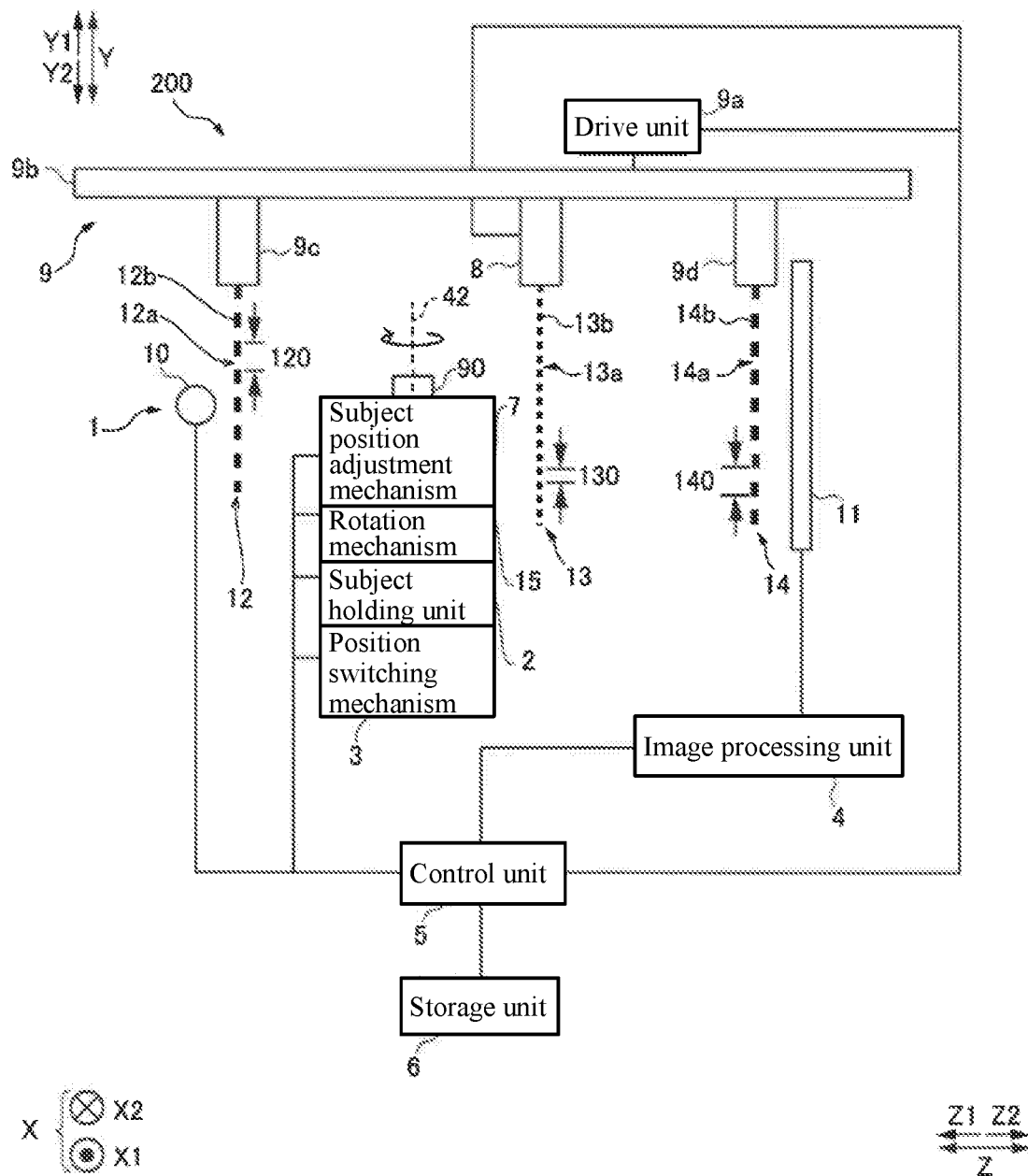
FIG. 15 is a schematic diagram of an X-ray phase imaging apparatus according to a third modified example.

In the above embodiment, an example is shown in which it is configured to perform imaging of the subject 90 in a state in which the subject 90 is fixed to the subject position adjustment mechanism 7, but the present invention is not limited to this configuration. For example, as in the X-ray phase imaging apparatus 200 according to the third modified example shown in FIG. 15, the apparatus may be configured to perform imaging while rotating the subject 90. More specifically, the X-ray phase imaging apparatus 200 is provided with the rotation mechanism 15 that relatively rotates the subject 90 and the imaging system 1 in a rotation direction about a direction perpendicular to the optical axis direction of the X-rays. The control unit 5 rotates the subject 90 in a direction about the axis line 42 perpendicular to the optical axis of the X-rays by a predetermined angle by controlling the rotation mechanism 15. The control unit 5 controls capturing the image of the subject 90 at each angle obtained by rotating the subject 90 to a predetermined angle. The X-ray phase imaging apparatus 200 according to the third modified example is configured so that a so-called computed tomography (CT: Computed Tomography) can be performed.

Figure 16:
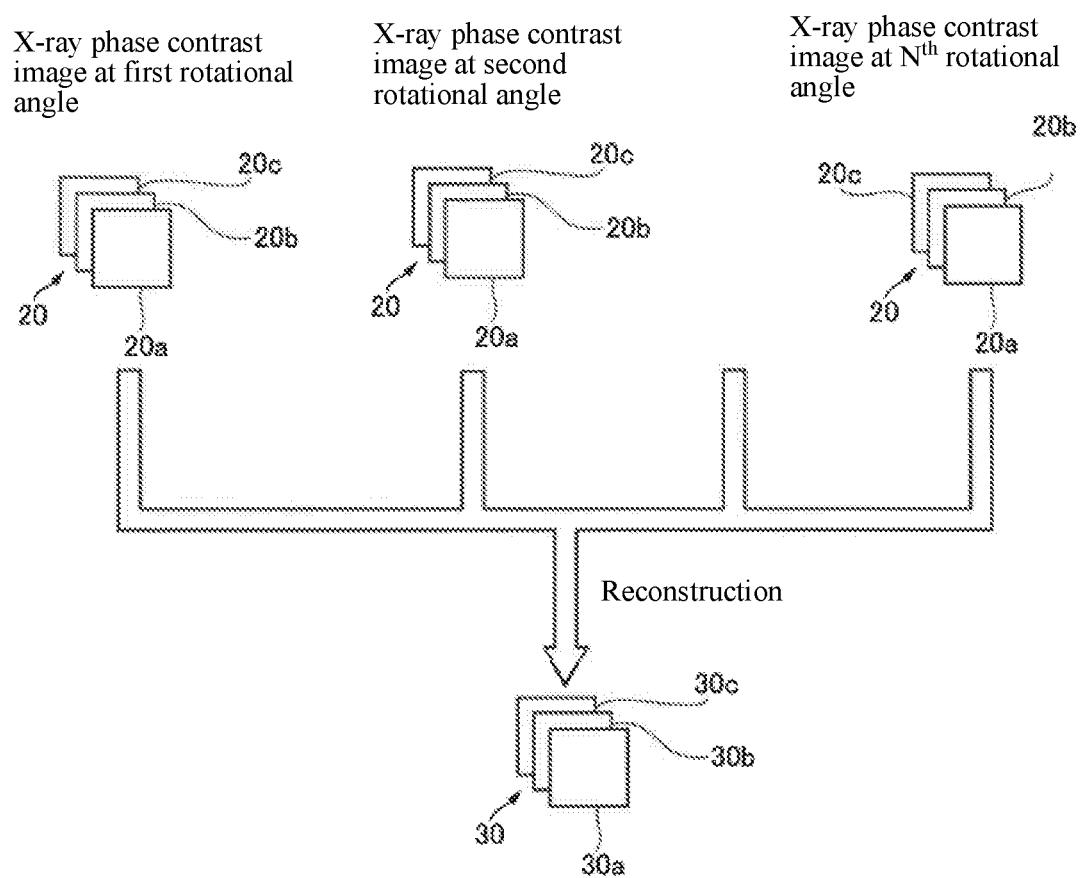
FIG. 16 is a schematic diagram for explaining a configuration for generating a three-dimensional X-ray phase contrast image.

In the third modified example, as shown in FIG. 16, the image processing unit 4 generates the X-ray phase contrast image 20 at each rotation angle based on the first image 21 and the second image 22 captured at each rotation angle. The image processing unit 4 is configured to generate a three-dimensional X-ray phase contrast image 30 based on the X-ray phase contrast image 20 at the respective rotational angles. The image processing unit 4 is configured to generate a three-dimensional absorption image 30a, a three-dimensional phase differential image 30b, and a three-dimensional dark field image 30c as a three-dimensional X-ray phase contrast image 30. In the third modified example, the control unit 5 is configured to control capturing the first image 21 and capturing the second image 22 every time the subject 90 is rotated by a predetermined angle when performing imaging while relatively rotating the subject 90 by the rotation mechanism 15.

Note that it is enough that the timing for capturing the first image 21 is determined based on the imaging time of the first image 21 and the second image 22. For example, when the imaging times of the first image 21 and the second image 22 are long, the first image 21 may be captured for each imaging at each of the rotational angles. When the imaging times of the first image 21 and the second image 22 are short, the first image 21 may be captured after performing imaging at a plurality of rotational angles.

Figure 17:
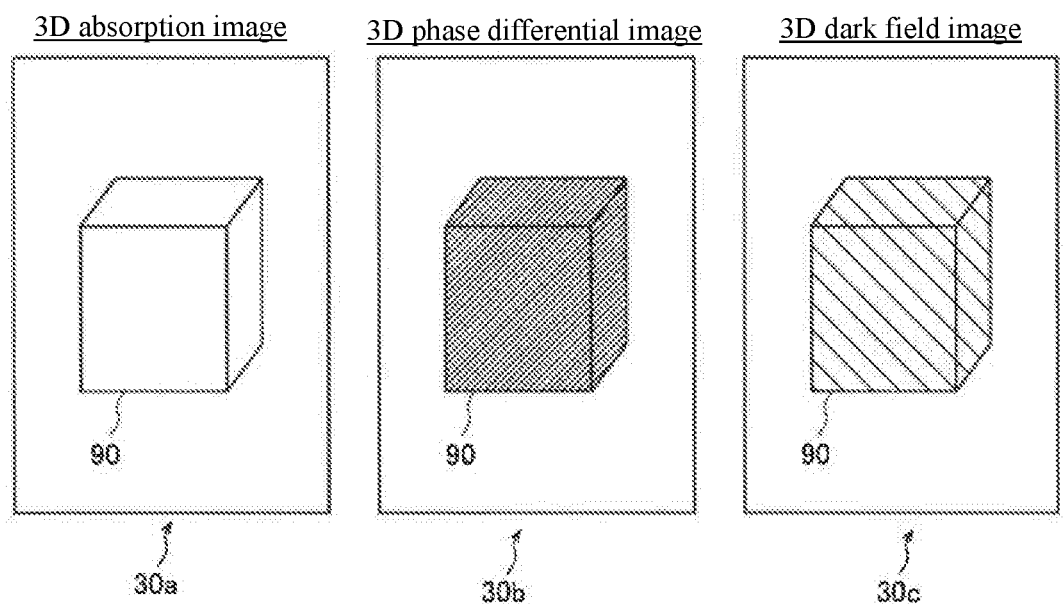
FIG. 17 is a schematic diagram for explaining a three-dimensional absorption image, a three-dimensional phase differential image, and a three-dimensional dark field image.

FIG. 17 is a schematic diagram of a three-dimensional X-ray phase contrast image 30. The three-dimensional absorption image 30a is an image obtained based on the change in the intensity of the X-rays detected by the detector 11 due to the X-rays being absorbed by the subject 90 as the X-rays pass through the subject 90. The three-dimensional phase differential image 30b is an image of the inner structure of the subject 90 obtained based on the phase shift of the X-rays generated when the X-rays pass through the subject 90. In addition, the three-dimensional dark field image 30c is an image of the inner structure of the subject 90 obtained based on the scattering of the minute angles of the X-rays generated when the X-rays pass through the subject 90.

Figure 18:
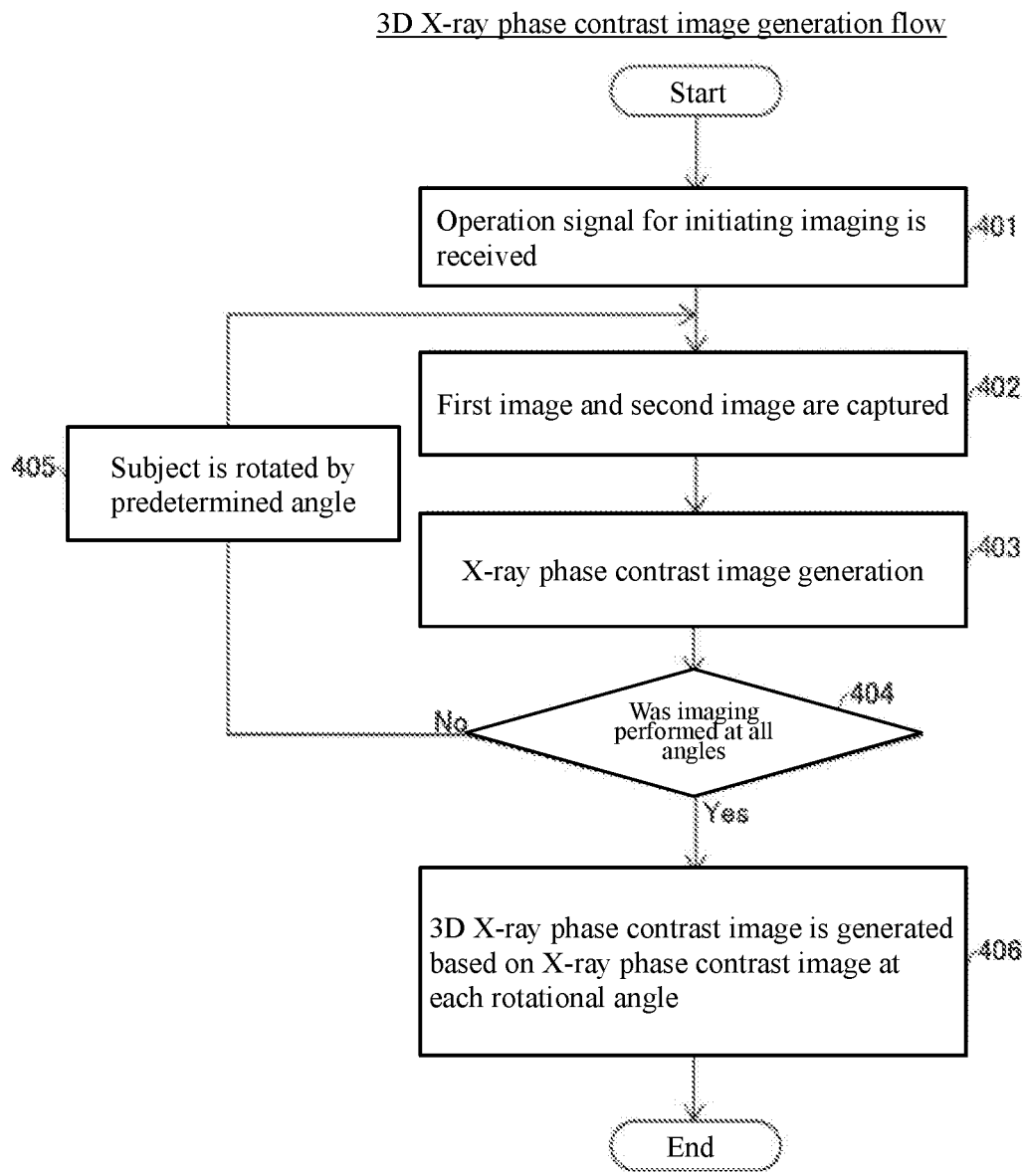
FIG. 18 is a flowchart for explaining the process of generating a three-dimensional X-ray phase contrast image by the third modified example.

Referring to FIG. 18, a flow of generating a three-dimensional X-ray phase contrast image by the X-ray phase imaging apparatus 200 according to the third modified example will be described.

In Step 401, the control unit 5 receives an operation signal for starting imaging. Note that the process of Step 401 is executed when the operator performs the image start operation after the subject 90 is arranged, similarly to the process of Step 101 in the above embodiment.

In Step 402, the control unit 5 controls capturing the first image 21 and capturing the second image 22. The process in Step 402 is the same process as the process in Step 102, Step 103, Step 104, Step 106, and Step 107 in the first embodiment, and therefore the detailed descriptions thereof will be omitted.

In Step 403, the image processing unit 4 generates the X-ray phase contrast image 20 based on the first image 21 and the second image 22. The process in Step 403 is the same process as the process in Step 108 in the above embodiment, and therefore the detailed descriptions thereof will be omitted.

In Step 404, the control unit 5 determines whether imaging has been performed at all angles. When the imaging has not been performed at all angles, the process proceeds to Step 405. When the imaging has been performed at all angles, the process proceeds to Step 406.

In Step 405, the control unit 5 controls the rotation mechanism 15 to rotate the subject 90 by a predetermined angular amount. Thereafter, the process proceeds to Step 402.

In Step 406, the image processing unit 4 generates the three-dimensional X-ray phase contrast image 30 based on the X-ray phase contrast image 20 at the respective rotational angles. Thereafter, the process ends.

As described above, by configuring to perform the imaging of the first image 21 and the second image 22 each time that the subject 90 is rotated by the predetermined angel when performing imaging while relatively rotating the subject 90 by the rotation mechanism 15, when performing the CT imaging, which takes time to perform imaging, the first image 21 is automatically updated for each predetermined rotation angle. Therefore, the burden on the operator can be reduced as compared with the configuration in which the operator removes the subject 90 every time the first image 21 is rotated by a predetermined angle. Further, since the image quality of the X-ray phase contrast image 20 at the respective rotational angles can be suppressed from being deteriorated, the image quality of the three-dimensional X-ray phase contrast image 30 can be suppressed from being deteriorated.

Other Modified Example

In the above embodiments, the position of the second grating 13 is adjusted every time the first image 21 is updated, but the present invention is not limited to this configuration. The position of the second grating 13 may not be adjusted every time. For example, when the positional deviations of the plurality of gratings are within the allowable ranges, the position of the second grating 13 may not be adjusted.

Further, in the above embodiment, an example is shown in which it is configured such that the retracted position 60 and the imaging position 61 are switched by moving the subject holding unit 2 with the position switching mechanism 3, the present invention is not limited thereto. For example, the position switching mechanism 3 may be configured to switch between the retracted position 60 and the imaging position 61 by moving the imaging system 1. However, when the position switching mechanism 3 is configured to move the imaging system 1, since the position switching mechanism 3 becomes larger and the device configuration of the position switching mechanism 3 becomes complicated, it is preferable that the position switching mechanism 3 be configured to move the subject holding unit 2.

In the above embodiment, an example is shown in which it is configured such that the retracted position 60 and the imaging position 61 are switched by moving the subject holding unit 2 in the Y-direction direction with the position switching mechanism 3, but the present invention is not limited to this configuration. For example, the position switching mechanism 3 may be configured to switch between the retracted position 60 and the imaging position 61 by moving the subject holding unit 2 in the X-direction direction.

In the above embodiment, an example is shown in which the control unit 5 controls executing imaging at the retracted position 60 and imaging at the imaging position 61 on the basis of one operation input signal, but the present invention is not limited to this configuration. For example, the control unit 5 may be configured to control each imaging based on an imaging operation signal at the retracted position 60 and an imaging operation signal at the imaging position 61.

However, since there is a possibility that the positional deviation of the plurality of gratings becomes large when the interval between the imaging at the retracted position 60 and the imaging at the imaging position 61 becomes long, it is preferable to configure such that the control unit 5 controls executing the imaging at the retracted position 60 and the imaging at the imaging position 61 based on one operation input signal in order to shorten the interval between the imaging of the first image 21 and the imaging of the second image 22.

In addition, when the imaging of the first image 21 and the imaging of the second image 22 are performed on the basis of different operation input signals, the number of operations by the operator increases. Therefore, in order to reduce the burden on the operator, it is preferable to configure the control unit 5 so as to control executing imaging at the retracted position 60 and imaging at the imaging position 61 on the basis of one operation input signal.

Further, in the above embodiment, an example is shown in which in a state in which X-rays are being emitted from the X-ray source 10, the control unit 5 controls moving to the retracted position 60 and imaging at the retracted position 60 and moving to the imaging position 61 and imaging at the imaging position 61 as a sequence of operations, but the present invention is not limited to this configuration. When the time for turning off the power of the X-ray source 10 is short, it is possible to suppress the X-ray source 10 from becoming unstable, and it is possible to suppress the effect of turning off the power of the X-ray source 10. Therefore, between moving to the retracted position 60 and imaging at the retracted position 60 and moving to the imaging position 61 and imaging at the imaging position 61, if it is a short time, the power of the X-ray source 10 may be turned off.

In the above embodiment, an example is shown in which the image processing unit 4 generates the third image 23 and removes the noises 23a generated in the X-ray phase contrast image 20, but the present invention is not limited to this configuration. For example, when the degradation of the image quality of the X-ray phase contrast image 20 due to the noises 23a caused by the imaging system 1 is within an allowable range, the image processing unit 4 may not generate the third image 23.

In the above embodiment, an example is shown in which the imaging system holding unit 9 is configured to suspend and hold the plurality of gratings in the Y1-direction, but the present invention is not limited to this configuration. For example, the imaging system holding unit 9 may be configured to hold a plurality of gratings by supporting the plurality of gratings in the Y2-direction. When the imaging system holding unit 9 is configured to hold a plurality of gratings from the lower side (Y2), the position switching mechanism 3 may be configured to switch between the retracted position 60 and the imaging position 61 by holding the subject holding unit 2 (subject 90) from the upper side (Y1-direction) and moving it in the up-down direction (Y-direction).

In the above embodiment, an example is shown in which the first grating 12, the second grating 13, and the third grating 14 are provided as a plurality of gratings, but the present invention is not limited to this configuration. For example, when the coherence of the X-rays emitted from the X-ray source 10 is high, the first grating 12 may not be provided.

In the above embodiment, an example is shown in which the grating position adjustment mechanism 8 adjusts the position of the second grating 13 to adjust the positional deviation of the plurality of gratings, but the present invention is not limited to this configuration. The grating adjusted by the grating position adjustment mechanism 8 may be any grating.

In the above embodiment, an example is shown in which the grating position adjustment mechanism 8 captures an image while translating the second grating 13, but the present invention is not limited to this configuration. The grating that the grating position adjustment mechanism 8 translates may be any grating.

In the above embodiment, an example is shown in which the X-ray phase imaging apparatus 100 generates the X-ray phase contrast image 20 by the so-called fringe scan method in which imaging is performed while translating the second grating 13, but the present invention is not limited to this configuration. For example, it may be configured such that the X-ray phase contrast image 20 is generated by a moiré one-shot method in which any one of a plurality of gratings is rotated in the X-Y plane to form a moiré fringe and capture the image.

In the above embodiment, an example is shown in which the X-ray transmission portion 12a and the X-ray absorption portion 12b of the first grating 12 are arranged at a predetermined pitch (pitch 120) in the up-down (Y-direction) direction, but the present invention is not limited to this configuration. For example, the X-ray transmission portion 12a and the X-ray absorption portion 12b of the first grating 12 may be arranged in the right-left direction (X-direction). Further, the X-ray transmission portion 12a and the X-ray absorption portion 12b of the first grating 12 may be arranged obliquely. Further, the same can be applied to the slit 13a and X-ray phase change portion 13b of the second grating 13. The same can be applied to the X-ray transmission portion 14a and the X-ray absorption portion 14b of the third grating 14.

Aspects

It will be appreciated by those skilled in the art that the above described exemplary embodiments are illustrative of the following aspects.

Item 1

An X-ray phase imaging apparatus comprising:

an imaging system including an X-ray source, a detector for detecting X-rays emitted from the X-ray source, and a plurality of gratings arranged between the X-ray source and the detector;

a subject holding unit configured to hold a subject;

a position switching mechanism configured to switch between a retracted position in which a position of the subject is out of a region to be imaged by the detector and an imaging position in which the position of the subject is within the region to be imaged by the detector by changing a relative position between the subject holding unit and the imaging system;

a control unit configured to control switching between the retracted position and the imaging position by the position switching mechanism; and an image processing unit configured to generate an X-ray phase contrast image based on a first image captured at the retracted position and a second image captured at the imaging position, wherein the control unit is configured to control sequentially imaging at the retracted position and imaging at the imaging position.

Item 2

The X-ray phase imaging apparatus as recited in the aforementioned Item 1, wherein the position switching mechanism is configured to switch between the retracted position and the imaging position by moving the subject holding unit, and wherein the control unit is configured to control imaging at the retracted position and imaging at the imaging position based on one operation input signal.

Item 3

The X-ray phase imaging apparatus as recited in the aforementioned Item 1, wherein the control unit is configured control sequentially moving to the retracted position and imaging at the retracted position and moving to the imaging position and imaging at the imaging position in a state in which X-rays are being emitted from the X-ray source.

Item 4

The X-ray phase imaging apparatus as recited in the aforementioned Item 1, further comprising:

a storage unit configured to store the first image, wherein the image processing unit is configured to generate the X-ray phase contrast image based on the first image and the second image stored in the storage unit, and wherein the control unit is configured to determine whether or not to update the first image stored in the storage unit based on a pixel value of a background portion of the X-ray phase contrast image and to control capturing the first image at the retracted position when updating the first image.

Item 5

The X-ray phase imaging apparatus as recited in the aforementioned Item 4, further comprising:

a grating position adjustment mechanism configured to adjust a relative position of the plurality of gratings, wherein the control unit is configured, when updating the first image stored in the storage unit, to perform a positional adjustment of the plurality of gratings by the grating position adjustment mechanism, perform a positional adjustment of the plurality of gratings, and then perform imaging of the first image and an updating process of the first image stored in the storage unit.

Item 6

The X-ray phase imaging apparatus as recited in the aforementioned Item 4, wherein the control unit is configured to control switching between a first imaging mode for updating the first image stored in the storage unit and a second imaging mode for updating the first image stored in the storage unit based on a determination based on a pixel value of a background portion of the X-ray phase contrast image, or based on an operation input by an operator every time the second image is captured, every predetermined number of times the second image is captured, or every random number of times the second image is captured.

Item 7

The X-ray phase imaging apparatus as recited in the aforementioned Item 1, wherein the image processing unit is configured to generate a third image for removing noises caused by the imaging system and to remove the noises from the X-ray phase contrast image based on the generated third image, and wherein the control unit is configured to control moving the subject holding unit to the retracted position by the position switching mechanism when capturing the third image and moving the subject holding unit to the imaging position after capturing the third image.

Item 8

The X-ray phase imaging apparatus as recited in the aforementioned Item 1, further comprising:

an imaging system holding unit which extends in an optical axis direction of X-rays to at least hold the plurality of gratings by suspending them from above, wherein the position switching mechanism is configured to switch between the retracted position and the imaging position by moving the subject holding unit in an up-down direction.

Item 9

The X-ray phase imaging apparatus as recited in the aforementioned Item 1, further comprising:

a rotation mechanism configured to relatively rotate the subject and the imaging system in a rotation direction about a direction perpendicular to an optical axis direction of X-rays, wherein the control unit is configured to control capturing the first image and capturing the second image every time the subject is rotated by a predetermined angle when performing imaging while relatively rotating the subject by the rotation mechanism.

Item 10

An X-ray phase contrast image generation method comprising:

a step of moving a subject to a retracted position in which a position of the subject is out of a region to be imaged by relatively moving an imaging system including an X-ray source, a detector for detecting X-rays emitted from the X-ray source, and a plurality of gratings arranged between the X-ray source and the detector and a subject holding unit for holding the subject;

a step of capturing a first image at the retracted position;

a step of relatively moving the subject holding unit and the imaging system to an imaging position where the position of the subject is within the region to be imaged by the detector;

a step of capturing a second image at the imaging position; and a step of generating an X-ray phase contrast image based on the first image and the second image, wherein the step of capturing the first image and the step of capturing the second image are performed as a sequence of operations.

Item 11

The X-ray phase contrast image generation method dependent on the aforementioned Item 10, wherein the step of moving the subject to the retracted position and the step of moving the subject to the imaging position are performed by moving the subject holding unit, and wherein the step of capturing the first image at the retracted position and the step of capturing the second image at the imaging position are performed based on one operation input signal.

The invention claimed is:

1. An X-ray phase imaging apparatus comprising:
an imaging system including an X-ray source, a detector for detecting X-rays emitted from the X-ray source, and a plurality of gratings arranged between the X-ray source and the detector;
a subject holder having a top surface configured to hold a subject;
a position switch having a moving portion configured to switch between a retracted position in which a position of the subject is out of a region to be imaged by the detector and an imaging position in which the position of the subject is within the region to be imaged by the detector by changing a relative position between the subject holder and the imaging system;
a controller configured to control switching between the retracted position and the imaging position by the position switch; and
an image processor configured to generate an X-ray phase contrast image based on a first image captured at the retracted position and a second image captured at the imaging position,
wherein the controller is configured to control sequentially moving the subject from the imaging position to the retracted position, imaging at the retracted position, moving the subject from the retracted position to the imaging position, and imaging at the imaging position based on a single operation input signal which is input by an operator.

2. The X-ray phase imaging apparatus as recited in claim 1,
wherein the controller is configured to control sequentially moving to the retracted position and imaging at the retracted position and moving to the imaging position and imaging at the imaging position in a state in which X-rays are being emitted from the X-ray source.

3. An X-ray phase imaging comprising:
an imaging system including an X-ray source, a detector for detecting X-rays emitted from the X-ray source, and a plurality of gratings arranged between the X-ray source and the detector;
a subject holder having a top surface configured to hold a subject;
a position switch having a moving portion configured to switch between a retracted position in which a position of the subject is out of a region to be imaged by the detector and an imaging position in which the position of the subject is within the region to be imaged by the detector by changing a relative position between the subject holder and the imaging system;
a controller configured to control switching between the retracted position and the imaging, position by the position switch; and
an image processor unit configured to generate an Z-ray phase contrast image based on a first image captured at the retracted position and a second image captured at the imaging position,
a memory configured to store the first image,
wherein the controller is configured to control sequentially imaging at the retracted position and imaging at the imaging position, wherein the image processor is configured to generate the X-ray phase contrast image based on the first image and the second image stored in the memory, and
wherein the controller is configured to determine whether or not to update the first image stored in the memory based on a pixel value of a background portion of the X-ray phase contrast image and to control capturing the first image at the retracted position when updating the first image.

4. The X-ray phase imaging apparatus as recited in claim 3, further comprising:
a grating position adjuster configured to adjust a relative position of the plurality of gratings,
wherein the controller is configured, when updating the first image stored in the memory, to perform a positional adjustment of the plurality of gratings by the grating position adjuster, perform a positional adjustment of the plurality of gratings, and then perform imaging of the first image and an updating process of the first image stored in the memory.

5. The X-ray phase imaging apparatus as recited in claim 3,
wherein the controller is configured to control switching between a first imaging mode for updating the first image stored in the memory and a second imaging mode for updating the first image stored in the memory based on a determination based on a pixel value of a background portion of the X-ray phase contrast image, or based on an operation input by an operator every time the second image is captured, every predetermined number of times the second image is captured, or every random number of times the second image is captured.

6. The X-ray phase imaging apparatus as recited in claim 1,
wherein the image processor is configured to generate a third image for removing noises caused by the imaging system and to remove the noises from the X-ray phase contrast image based on the generated third image, and
wherein the controller is configured to control moving the subject holder to the retracted position by the position switch when capturing the third image and moving the subject holder to the imaging position after capturing the third image.

7. The X-ray phase imaging apparatus as recited in claim 1, further comprising:
an imaging system holder which extends in an optical axis direction of X-rays to at least hold the plurality of gratings by suspending them from above,
wherein the position switch is configured to switch between the retracted position and the imaging position by moving the subject holder in an up-down direction.

8. The X-ray phase imaging apparatus as recited in claim 1,
wherein the controller is configured to control capturing the first image and capturing the second image every time the subject is rotated by a predetermined angle when performing imaging while relatively rotating the subject in a rotation direction about a direction perpendicular to an optical axis direction of X-rays.

9. An X-ray phase contrast image generation method comprising:
a step of moving a subject to a retracted position in which a position of the subject is out of a region to be imaged by relatively moving an imaging system including an X-ray source, a detector for detecting X-rays emitted from the X-ray source, and a plurality of gratings arranged between the X-ray source and the detector and a subject holder for holding the subject;

a step of capturing a first image at the retracted position;

a step of relatively moving the subject holder and the imaging system to an imaging position where the position of the subject is within the region to be imaged by the detector;

a step of capturing a second image at the imaging position; and a step of generating an X-ray phase contrast image based on the first image and the second image, wherein the step of moving the subject to the retracted position, the step of capturing the first image, the step of relatively moving the subject holder and the imaging system to the imaging position, and the step of capturing the second image are performed as a sequence of operations based on a single operation input signal which is input by an operator.

10. The X-ray phase contrast image generation method as recited in claim 9, wherein the step of moving the subject to the retracted position and the step of moving the subject to the imaging position are performed by moving the subject holder, and wherein the step of capturing the first image at the retracted position and the step of capturing the second image at the imaging position are performed based on one operation input signal.

11. An X-ray phase imaging apparatus comprising:

an imaging system including an X-ray source, a detector for detecting X-rays emitted from the X-ray source, and a plurality of gratings arranged between the X-ray source and the detector;

a subject holder having a top surface configured to hold a subject;

a position switch having a main body portion and a moving portion connected to the bottom surface of the subject holder, the moving portion of the position switch configured to expand and contract to thereby move the subject holder between a retracted position in which a position of the subject is out of a region to be imaged by the detector and an imaging position in which the position of the subject is within the region to be imaged by the detector by changing a relative position between the subject holder and the imaging system;

a controller configured to control switching between the retracted position and the imaging position by the position switch; and an image processor configured to generate an X-ray phase contrast image based on a first image captured at the retracted position and a second image captured at the imaging position, wherein the controller is configured to control sequentially imaging at the retracted position and imaging at the imaging position, wherein the controller is further configured to control sequentially moving the subject from the imaging position to the retracted position, imaging at the retracted position, moving the subject from the retracted position to the imaging position, and imaging at the imaging position based on a single operation input signal which is input by an operator.

* * * * *